US008065369B2

(12) United States Patent
Turski et al.

(10) Patent No.: US 8,065,369 B2
(45) Date of Patent: Nov. 22, 2011

(54) PEOPLE-CENTRIC VIEW OF EMAIL

(75) Inventors: Andrzej Turski, Redmond, WA (US);
Shelly D. Farnham, Seattle, WA (US);
Lili Cheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1346 days.

(21) Appl. No.: 11/048,210

(22) Filed: Feb. 1, 2005

(65) Prior Publication Data

US 2006/0173961 A1    Aug. 3, 2006

(51) Int. Cl.
G06F 15/16    (2006.01)
(52) U.S. Cl. ............................. 709/206; 709/200; 715/700
(58) Field of Classification Search .................. 709/206; 715/700
See application file for complete search history.

(56) References Cited

U.S. PATENT DOCUMENTS

| | | | |
|---|---|---|---|
| 6,480,885 B1 * | 11/2002 | Olivier .......................... | 709/207 |
| 6,539,379 B1 * | 3/2003 | Vora et al. ..................... | 1/1 |
| 6,725,228 B1 * | 4/2004 | Clark et al. .................... | 1/1 |
| 6,832,245 B1 * | 12/2004 | Isaacs et al. ................... | 709/206 |
| 6,839,737 B1 * | 1/2005 | Friskel .......................... | 709/206 |
| 6,985,926 B1 * | 1/2006 | Ferlauto et al. ................ | 709/206 |
| 7,054,905 B1 * | 5/2006 | Hanna et al. ................... | 709/206 |
| 7,120,865 B1 * | 10/2006 | Horvitz et al. ................. | 715/210 |
| 7,155,481 B2 * | 12/2006 | Prahlad et al. ................. | 709/206 |
| 7,167,910 B2 * | 1/2007 | Farnham et al. ............... | 709/223 |
| 7,313,760 B2 * | 12/2007 | Grossman et al. ............. | 715/708 |
| 7,343,365 B2 * | 3/2008 | Farnham et al. ............... | 707/1 |
| 7,370,045 B2 * | 5/2008 | Vora et al. ..................... | 717/106 |
| 7,386,591 B2 * | 6/2008 | Miller et al. ................... | 709/206 |
| 7,421,514 B2 * | 9/2008 | Lee ................................ | 709/246 |
| 7,421,690 B2 * | 9/2008 | Forstall et al. ................ | 718/100 |
| 7,430,719 B2 * | 9/2008 | Pettinati et al. ............... | 715/739 |
| 7,680,513 B2 * | 3/2010 | Haitani et al. ............. | 455/556.2 |
| 2003/0041112 A1 * | 2/2003 | Tada et al. ..................... | 709/206 |
| 2004/0078447 A1 * | 4/2004 | Malik et al. ................... | 709/206 |
| 2004/0119732 A1 * | 6/2004 | Grossman et al. ............. | 345/708 |
| 2004/0177319 A1 * | 9/2004 | Horn ........................... | 715/501.1 |
| 2004/0199529 A1 * | 10/2004 | Clark et al. .................... | 707/100 |
| 2005/0204009 A1 * | 9/2005 | Hazarika et al. ............... | 709/206 |

(Continued)

OTHER PUBLICATIONS

George W. Furnas, Generalized Fisheye Views, Human Factors in Computing Systems CHI '86 Conference Proceedings, 1986, 16-23, ACM.

(Continued)

Primary Examiner — John Follansbee
Assistant Examiner — Anthony Mejia
(74) Attorney, Agent, or Firm — Lee & Hayes, PLLC

(57) ABSTRACT

The subject invention provides a unique system and method that facilitates contact- or people-based organization of messages. A list of contacts can be generated based on the people or groups who have communicated with the user (mailbox owner) via email or otherwise. To view desired messages, a user can select one or more contacts that participated in the desired messages as either a recipient or sender. Following the selection, messages between the selected contacts and the user can be displayed in a window. Any items or information shared in the messages can be viewed in a separate window. A link can be maintained between any shared item and its message of origin. The user can also view messages that include third parties. The contact list is dynamic and due to limited display space, contacts communicating the most frequently with the user can be listed on a top level.

18 Claims, 30 Drawing Sheets

U.S. PATENT DOCUMENTS

| | | | |
|---|---|---|---|
| 2005/0210403 A1* | 9/2005 | Satanek | 715/786 |
| 2006/0010104 A1* | 1/2006 | Pettinati et al. | 707/3 |
| 2006/0031327 A1* | 2/2006 | Kredo | 709/206 |
| 2006/0075044 A1* | 4/2006 | Fox et al. | 709/206 |
| 2006/0123346 A1* | 6/2006 | Totman et al. | 715/748 |
| 2006/0129444 A1* | 6/2006 | Baeza et al. | 705/8 |
| 2006/0129643 A1* | 6/2006 | Nielson et al. | 709/206 |
| 2006/0129647 A1* | 6/2006 | Kaghazian | 709/206 |
| 2006/0168025 A1* | 7/2006 | Jain | 709/206 |
| 2006/0168073 A1* | 7/2006 | Kogan et al. | 709/206 |
| 2006/0168543 A1* | 7/2006 | Zaner-Godsey et al. | 715/835 |
| 2006/0224675 A1* | 10/2006 | Fox et al. | 709/206 |
| 2006/0271870 A1* | 11/2006 | Anwar | 715/764 |

OTHER PUBLICATIONS

Olle Balter, Keystroke Level Analysis of Email Message Organization, The CHI Letters, 2000, 105-112, vol. 2- Issue 1, ACM.

Steve Whittaker et al., Email Overload: Exploring Personal Information Management of Email, Human Factors in Computing Systems CHI '96 Conference Proceedings, 1996.

Gina Danielle Venolia et al., Supporting Email Work Flow, Technical Report MSR-TR-2001-88, Microsoft Research, Dec. 2001, 10 pages.

Olle Balter et al., Bifrost Inbox Organizer: Giving Users Control Over the Inbox, ACM International Conference Proceeding Series, Proceedings of the Second Nordic Conference on Human-Computer Interaction, 2002, 111-118, ACM Press New York, NY USA.

Jacek Gwizdka, Email Task Management Styles: The Cleaners and The Keepers, Conference on Human Factors in Computing Systems, CHI '04 Extended Abstracts on Human Factors in Computing Systems, Session: Late Breaking Results Paper, Apr. 24-29, 2004, 1235-1238 ACM.

Shelly Farnham, Personal Map: Automatically Modeling the User's Online Social Network, Proceedings of the 9th IFIP TC13 International Conference on Human-Computer Interaction, 2003, 4 pages.

Michael J. Muller et al., One-Hundred Days in an Activity-Centric Collaboration Environment Based on Shared Objects, Human Factors in Computing Systems CHI '04 Conference Proceedings, Apr. 24-29, 2004, 8 pages, ACM.

Jeremy Goecks et al., NuggetMine: Intelligent Groupware for Opportunistically Sharing Information Nuggets, Proceedings of the 7th International Conference on Intellingent User Interfaces, Jan. 13-16, 2002, 8 pages, ACM.

* cited by examiner

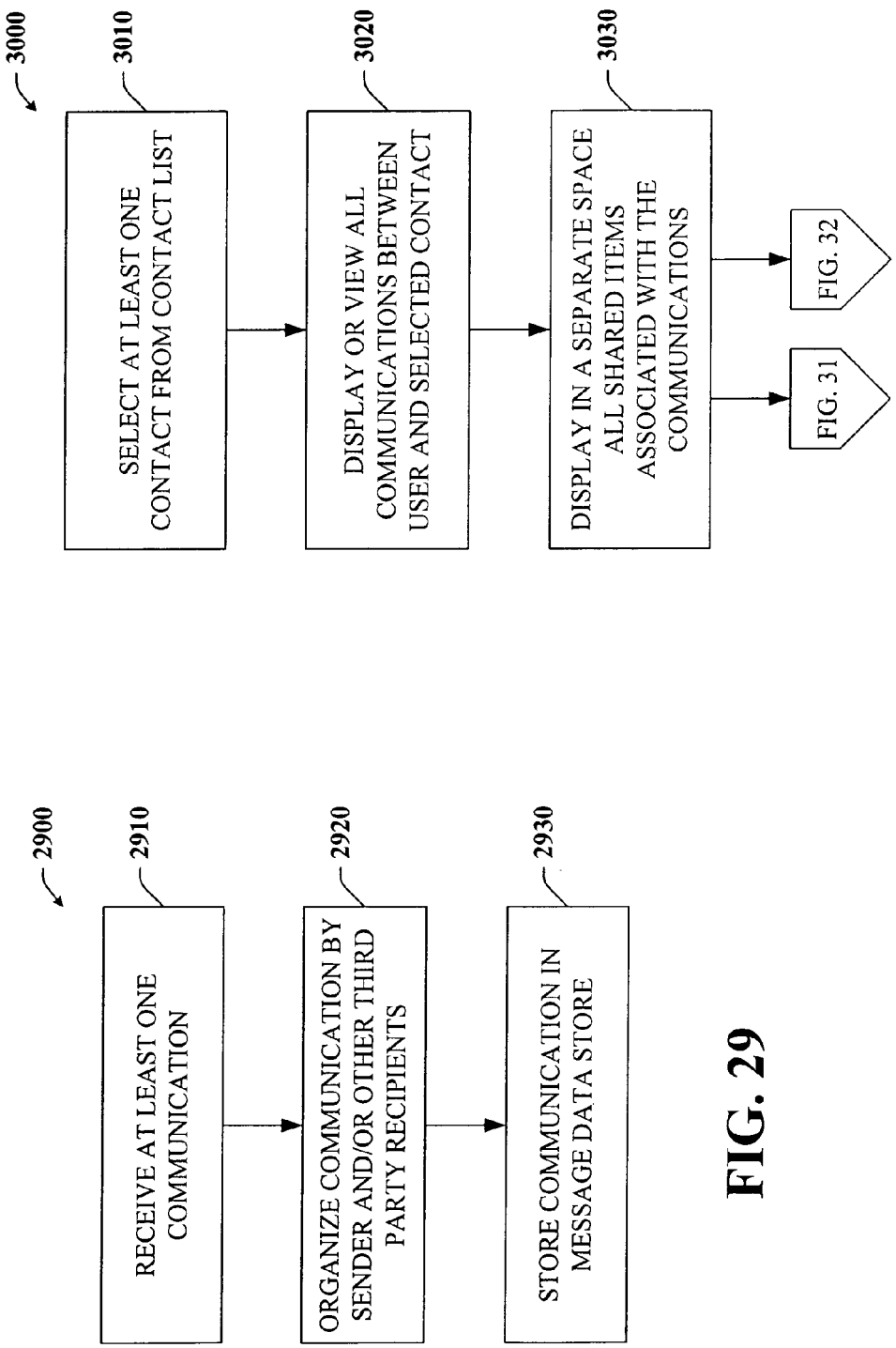

PEOPLE-CENTRIC VIEW OF EMAIL

TECHNICAL FIELD

The subject invention relates generally to email organization and in particular, to classifying and organizing a message store by people involved in the communication to facilitate navigating through and viewing communications related by sender and recipient(s) and subject matter.

BACKGROUND OF THE INVENTION

As the volume of information exchanged electronically grows, so does the need to organize it in a way that facilitates storage and future retrieval. Communication clients, particularly email clients, have become a repository of valuable data. Productivity of knowledge workers depends on the ability to find a requested piece of information that very often has arrived as an email or attachment.

The traditional way to organize email data uses a folder hierarchy, similar to the folder hierarchy of conventional file systems. In theory, the folder hierarchy is the ultimate classification—being completely user defined, it has the potential to be the best representation of user intentions. Unfortunately, it does not always work so well in practice.

The main problem with the folder classification system is that it does require an explicit user action, whether it is filing the message in the appropriate folder, or creating a rule to do so automatically. With the current volume of email communication, the job quickly becomes a chore that few users can maintain. Some user surveys have shown that many users simply give up on folder classification, keeping all or most of their incoming messages in the inbox and finding requested items by sorting and searching.

Even for those users who do file all the mail items on a regular basis, the folder system does not often work as well as expected. The problem is the discrepancy between the dynamic nature of interpersonal contacts and the static folder structure. Even the best designed folder hierarchy (and few real users are experts in the taxonomy necessary to create the "best" hierarchy,) becomes partially obsolete after a period and should be redesigned. However, the labor cost of re-classifying all the items, especially those in the archives, is very high and usually not justified by the added benefit of the new organization. Some users complained that in the end, the obsolete folder structure often becomes an obstacle rather then an advantage, as the user does not always remember where the item was placed.

There have been many attempts to organize email communications automatically. Many email clients allow creating automatic rules to move new messages into appropriate folders, but automatic removal of new messages from inbox also removes them from user focus.

Another approach is to use standing queries. For example, a query may look for all mail items involving a given person as a sender or recipient. Standing queries allow grouping messages without taking them out of the inbox. Some authors proposed a predefined set of standing queries that can be used to organize the inbox. However, the drawback of a predefined set is in the limited number of categories: it does not scale well when the number of contacts grow.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form, as a prelude to the more detailed description that is presented later.

The subject invention relates to a system and/or methodology that facilitate organizing, viewing and navigating through a message store in a people-based manner. In particular, the invention organizes the message data according to the sender or other contact associated with the data. In lieu of a traditional folder hierarchy list, a dynamic contact list can be employed. The contact list can comprise multiple tiers, whereby at the top tier or level of the list, the most frequently used contacts are shown. All other contacts are still accessible, but viewing them requires progressively more clicks depending on their respective tier location.

Determining which tier or level a contact is placed can be accomplished by at least two different approaches. In the first approach, the system and/or method can ascertain which contacts communicate most often with the user. When the frequency of communications satisfies a particular level's threshold, the contact name can be placed or kept at that level. The second approach involves user selection. More specifically, the user can expand the list to view other levels and then select a contact in a lower level. When the list is collapsed, the selected contact can be seen in the top level.

As previously mentioned, the contact list is dynamic; thus it can be continually updated. For some users, this can create disorientation and even a loss of control. To maintain some order with respect to the list, all contacts can be ordered alphabetically (e.g., by first name). Hence, a contact's name can be readily accessible to the user and easily found despite the dynamic nature of the contact list.

According to one aspect of the invention, messages can be automatically clustered based on the group or person who sent the message. For example, when a user wants to view messages from a particular person or group, the user can click on their name from the contact list. In an adjoining window on the display, messages between the user and the selected contact can be displayed. The messages can be organized in a conversation mode or in any other list mode (with or without a preview pane) as desired by the user.

In another aspect of the invention, messages can also be organized and viewed according to any other group or individuals included as recipients of the message (e.g., on the "To:", "cc:", or "bcc:" lines). When this option is selected, any message involving the user and the selected contact in addition to any other person or group can be shown. As can be imagined, this view often increases the number of messages available for viewing.

Yet another aspect of the invention facilitates more efficient organization of information shared between people. The information can be either in the form of attachments or as indirect links such as hyperlinks and calendar entries. In particular, the system and method can expose any shared items into a direct view. A virtual shared space that is populated with all the items shared with the user by email from a person or group can be created. When any one item is highlighted by the user, the corresponding message can be displayed in an adjoining window.

The shared space can also include a browser or view filter that allows the user to see the shared items by various groups such as type, sender, date, and/or folder, for example. Users can also further specify which items to view by employing a combination of such groups. For example, instead of looking at all web pages, the user may desire to see only the web pages shared with (or by) Jim Jones in the last 10 days. Furthermore, a preview of each shared item can be available to provide additional context with respect to the particular item and the associated message.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 9 illustrates an exemplary user interface for a message organizational and display system after a view option has been selected in accordance with an aspect of the subject invention.

FIG. 10 illustrates an exemplary user interface for a message organizational and display system after multiple contacts have been selected in accordance with an aspect of the subject invention.

FIG. 12 illustrates an exemplary user interface for navigating to a contact located on a lower level of a contact list that is employed in a message organizational and display system in accordance with an aspect of the subject invention.

FIG. 13 illustrates an exemplary user interface of the contact list of FIG. 12 that has been further expanded in accordance with an aspect of the subject invention.

FIG. 16 illustrates an exemplary user interface of a collapsed contact list showing only the top level whereby a contact from a lower level has been manually added in accordance with an aspect of the subject invention.

FIG. 17 illustrates an exemplary user interface for a message organizational and display system whereby a shared item is linked to its corresponding message when highlighted in accordance with an aspect of the subject invention.

FIGS. 18 and 19 illustrate exemplary user interfaces that demonstrate the link between a highlighted item in the shared space and the corresponding message in an adjacent window in accordance with an aspect of the subject invention.

FIG. 20 illustrates an exemplary user interface for a message organizational and display system that allows a user to browse through a shared space by a folder grouping in accordance with an aspect of the subject invention.

FIG. 22 illustrates an exemplary user interface for a message organizational and display system that allows a user to browse through a shared space by a date grouping in accordance with an aspect of the subject invention.

FIGS. 23-26 illustrate exemplary user interfaces for a message organizational and display system that allows a user to browse through a shared space by mail item type and then by one or more specific sub-groups in accordance with an aspect of the subject invention.

FIG. 29 is a flow chart illustrating an exemplary methodology that facilitates organizing a message store based on contact associations in accordance with an aspect of the subject invention.

FIG. 30 is a flow chart illustrating an exemplary methodology that facilitates viewing and/or navigating a desired portion of a message store based on contact associations in accordance with an aspect of the subject invention.

DETAILED DESCRIPTION OF THE INVENTION

Figure 1:
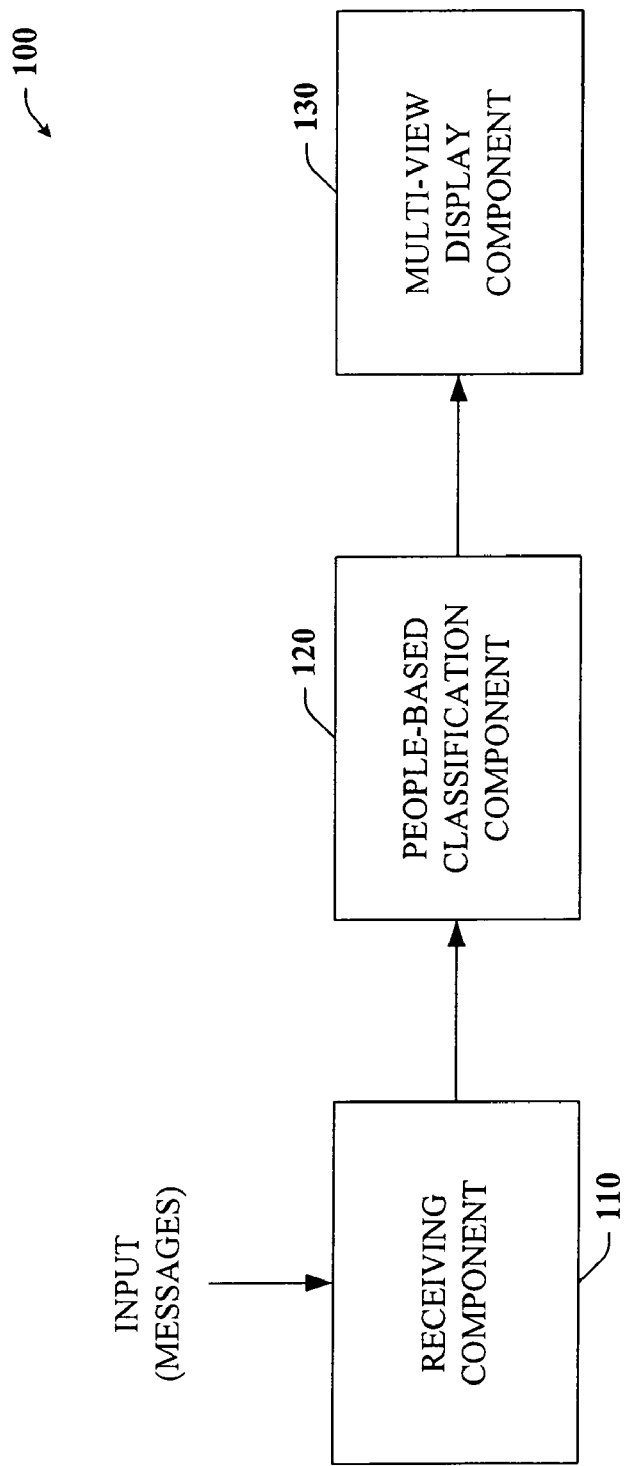
FIG. 1 is a high-level block diagram of a message organizational and display system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with determining communication frequency between a user and sender to ascertain at which level of a contact list the sender should be placed. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is a high-level block diagram of a contact-based message organization and display system 100 in accordance with an aspect of the subject invention. The system 100 includes a receiving component 110 that can receive input such as in the form of messages (e.g., email). Presumably, the messages are sent from a plurality of senders (e.g., person or group) to a user. As the messages flow in to the system 100 and through the receiving component 110, they can be organized by a people-based classification component 120. Unlike a traditional folder arrangement, the people-based classification component 120 can automatically sort and organize messages according to at least the sender. When a particular sender is selected from a list of senders, the corresponding messages between the sender and the user (e.g., any communication exchanged between the user and sender) can be shown on a multi-view display component 130. The display component 130 provides many different viewing options depending on the user's viewing preferences.

Though not depicted in the figure, the user can also have the option to view his/her messages such as in a general inbox. The traditional inbox containing often hundreds or thousands of messages can be overwhelming. For most users of email systems, the primary purpose of the inbox view is to indicate what's new, so that important messages can be reacted to in a timely manner. Including older messages in the same view actually gets into way, (e.g., by obscuring the unread messages count). If the message remains unread after a few days, then it was probably unimportant or the user became aware of its content from another source. Therefore, such messages should be removed from the view so that other incoming ones may get proper attention.

To support this functionality, the subject invention provides for a modified inbox view (and the view of other message flow folders, such as Sent Items and Drafts) that employs an auto-archiving component. Most if not all messages older then a few days (e.g., 3 days for Inbox—the number can be adjusted by the user) can be automatically removed from the view. All archived messages can still be found through the search or by browsing the list of senders (contacts). The user also has an option to keep any message in the Inbox view indefinitely by marking it with a "follow up" flag or some other symbol or notation.

Figure 2:
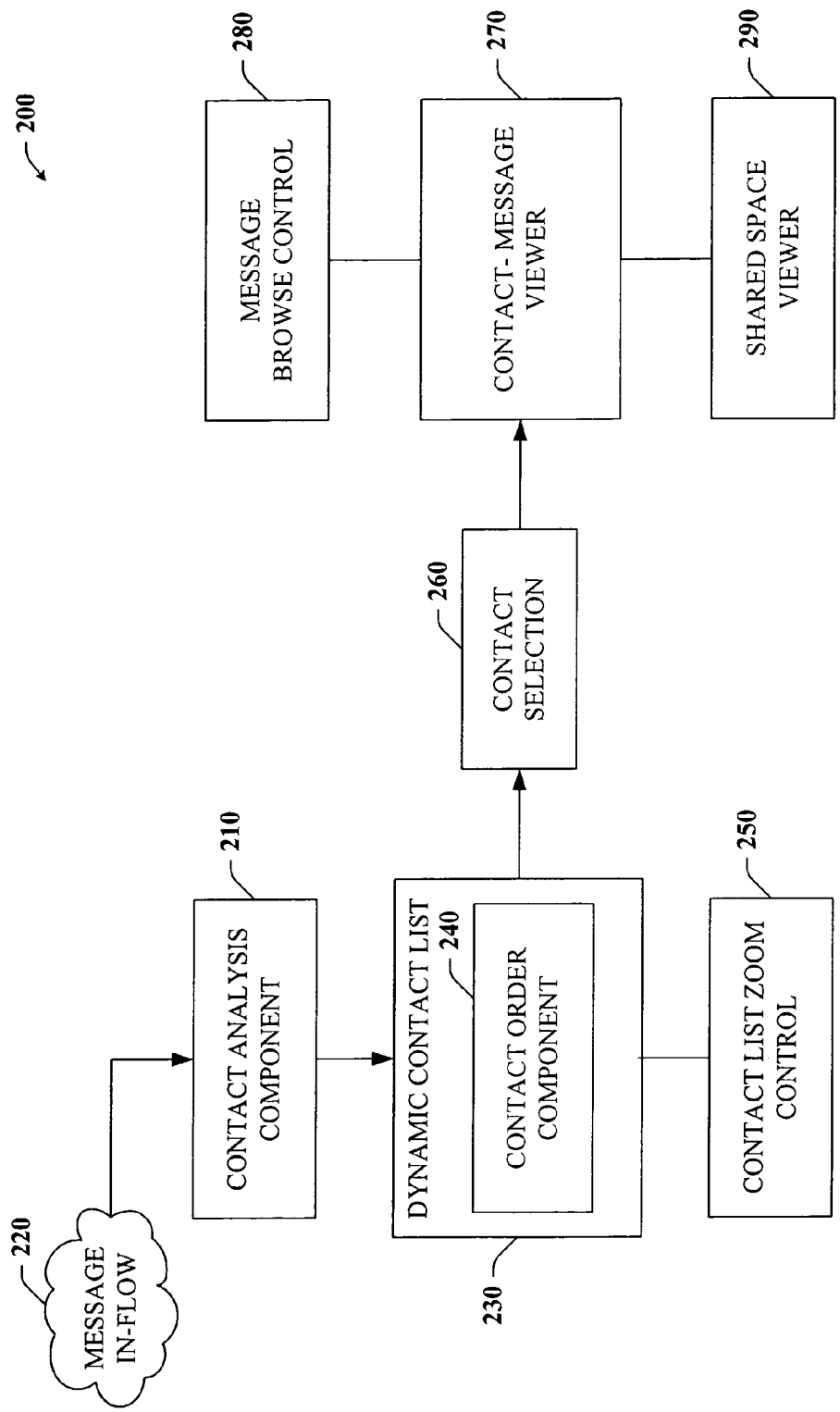
FIG. 2 is a block diagram of a message organizational and display system in accordance with an aspect of the subject invention.

Referring now to FIG. 2, there is illustrated a block diagram of a message organization and display system 200 that facilitates a people-centric association of messages. The system 200 includes a contact analysis component 210. Upon receipt of incoming messages (220) from various group or individual contacts, the contact analysis component 210 can examine the message to identify the sender as well as any other group or person included as a recipient of the message.

The identified sender can be communicated to a dynamic contact list 230, and in particular, to a contact order component 240. The contact order component 240 can perform at least two operations: add a new sender to the list in alphabetical order with respect to other names already present; and determine the frequency at which communications are exchanged between the user and the sender. The resulting frequency can affect on which level of importance the sender's name is placed. The level of importance or communication frequency can be measured by looking at the communication activity over the last 30 days, for example. To compensate for spam messages, the activity can be weighted toward the messages sent to the contact (from the user).

In general, the dynamic contact list uses the ranking information (e.g., importance determination) to select which names are shown first or on the top level, but orders the names alphabetically to make searching for a specific name easier and to avoid any suggestions about an individual's relative importance. The list can be selectively expanded bringing more names into view but can always hold to the strict alphabetic ordering.

Figure 11:
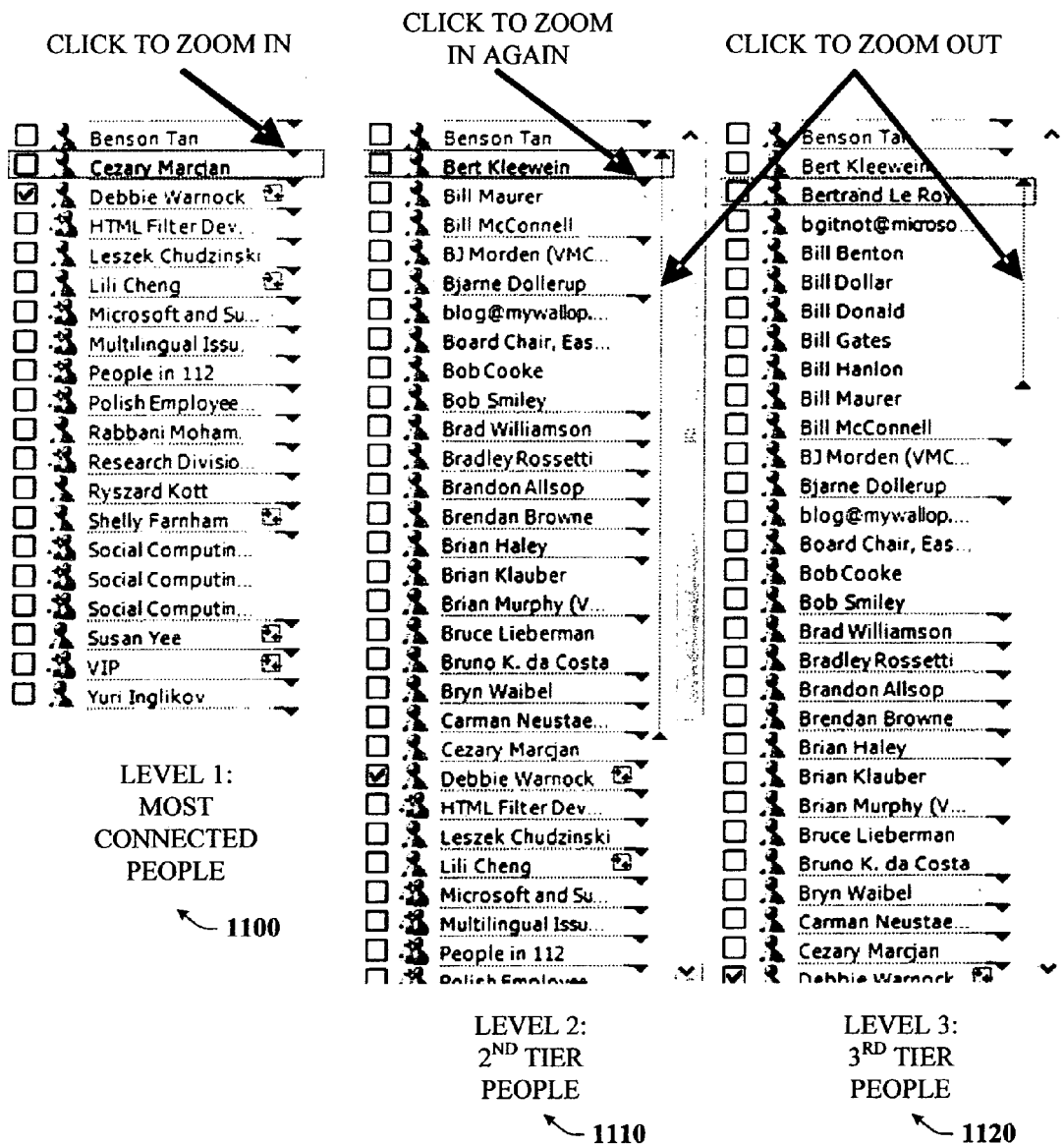
FIG. 11 is a schematic click-by-click diagram of navigating through a collapsible, expandable, and dynamic multi-level contact list employed in a message organizational and display system in accordance with an aspect of the subject invention.

The dynamic contact list 230 can be controlled or navigated through in part by a contact list zoom control 250 (e.g., see FIG. 11, infra, for further discussion). The zoom control 250 can be employed to expand and collapse various portions of the contact list 230 in order to locate particular names on the list and/or to visualize other names that either appear before or after any desired name. Recall that the dynamic contact list can rank contacts according to multiple levels of importance, whereby the top level can remain in view by default and the other lower levels can be folded in or collapsed. The zoom control 250 facilitates viewing the lower levels in a progressive manner. For example, getting to a contact on a bottom level (e.g., level 3 out of 3) may require additional clicks whereas a contact on the second level may require less.

To view messages from at least one contact from the list, the user can make a contact selection 260 such as by checking a box next to the contact. Almost immediately thereafter, a selection based message viewer 270 can display any communications exchanged between the user and the selected contact (in a separate window). The communications can be sorted or viewed in alternative modes (e.g., list view, conversation view, etc.) via a message browse control 280.

Furthermore, any attachments or hyperlinks included in any of the communications can be displayed in a separate window by way of a shared space viewer 290. Thus, the user can easily see all the information that was "shared" via the message system 200.

Figure 3:
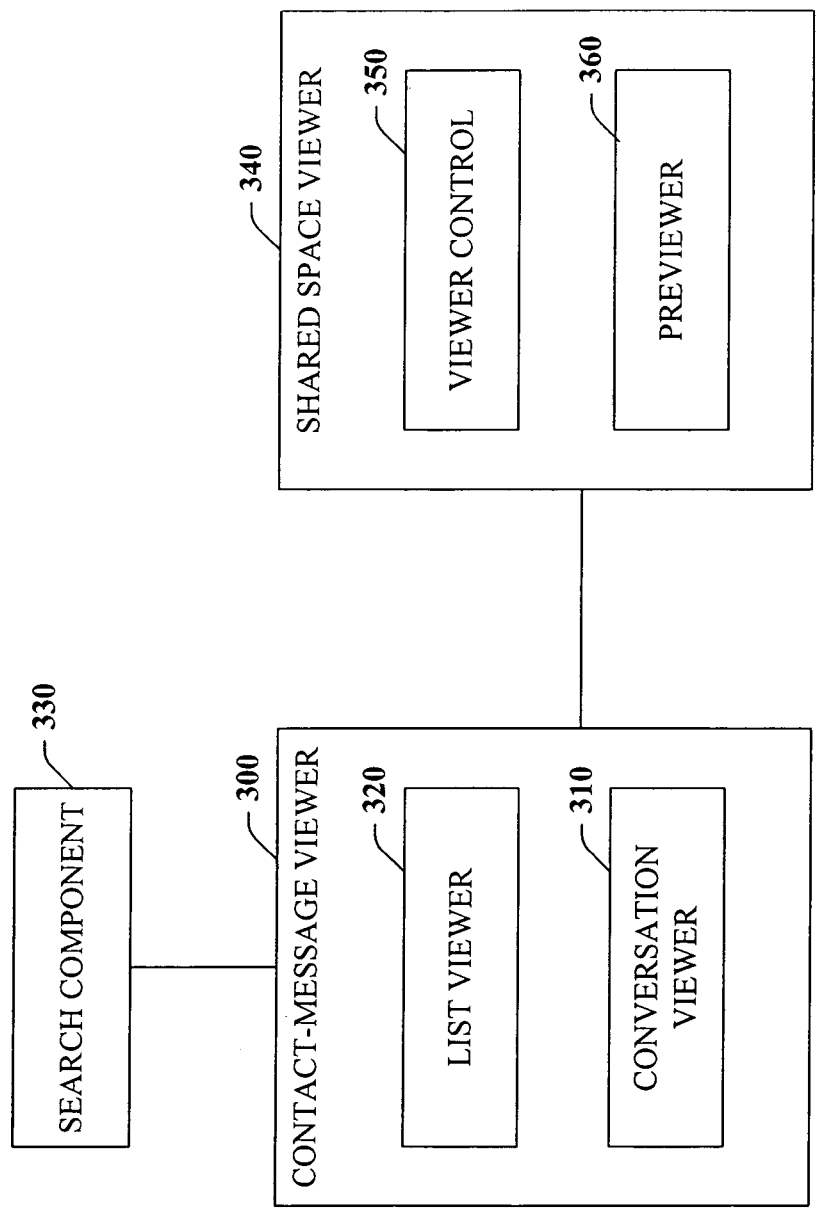
FIG. 3 is a block diagram of display controls employed in a message organizational and display system in accordance with an aspect of the subject invention.

Turning now to FIG. 3, there is illustrated various display controls that can be employed in a message organizational and display system (e.g., FIGS. 1 and/or 2, supra) in accordance with an aspect of the invention. For instance, a message viewer 300 can display messages associated with selected groups or individuals as a conversation view (by conversation viewer 310). In the conversation view, portions of each message can be seen in a chronological order to facilitate viewing related groups of communications within the context of the subject matter discussed therein. Thus, a message from the sender can be followed by a response by the user, which can then be followed with a response by the sender, and so on. To view any message in greater detail, the user can simply open it into another window (e.g., by clicking on the message).

Alternatively, a more compressed list view of each message can be displayed (by a list viewer 320). The list view may allow for more messages to be displayed particularly when given a limited amount of screen space. As with the whole message store, the messages displayed at any time by the message viewer 300 can be searched via a search component 330. The results of such a search can be searched again if desired (e.g., nested search).

Linked to the message viewer 300 is a shared space viewer 340. The shared space viewer can display any and all shared items that were sent with or included in the messages currently being shown by the message viewer. The shared space viewer 340 can also include a browse control 350 to allow a user to sort or browse the shared items according to the shared items' metadata. For example, the shared items can be grouped by type, sender, date, and folder. A previewer 360 can also be included in the shared space viewer 340. The previewer 360 can provide a thumbnail or other snapshot of the content of the shared item. Thus, if the item is a hyperlink, the previewer 360 can provide a snapshot of the corresponding document or web page.

Because the message viewer 300 and the shared space viewer 340 are linked, items in the shared space can change as the contacts selected for message viewing by the message viewer 300 change. For instance, imagine that the user has selected to see communications associated with Mary Smith. Any communications between the user and Mary Smith can be viewed in another window by the message viewer 300. Likewise, there are 5 spreadsheets associated with those communications which can be viewed by the shared space viewer 340. However, when the user de-selects Mary Smith and selects Joe Wright, a new set of messages will appear, as well as different shared items, if any.

Furthermore, when the user highlights or hovers over a particular shared item, the corresponding message can be shown in the relevant window by the message viewer 300. For example, suppose the corresponding message was off the screen, requiring the user to scroll down to it in order to see it. When the shared item belonging to that message is highlighted or hovered over, the message viewer can automatically bring that message up (or scroll to the message) into the viewable screen space. It should be appreciated that the message still remains in order according to specified sorting (e.g., chronological by date).

Figure 4:
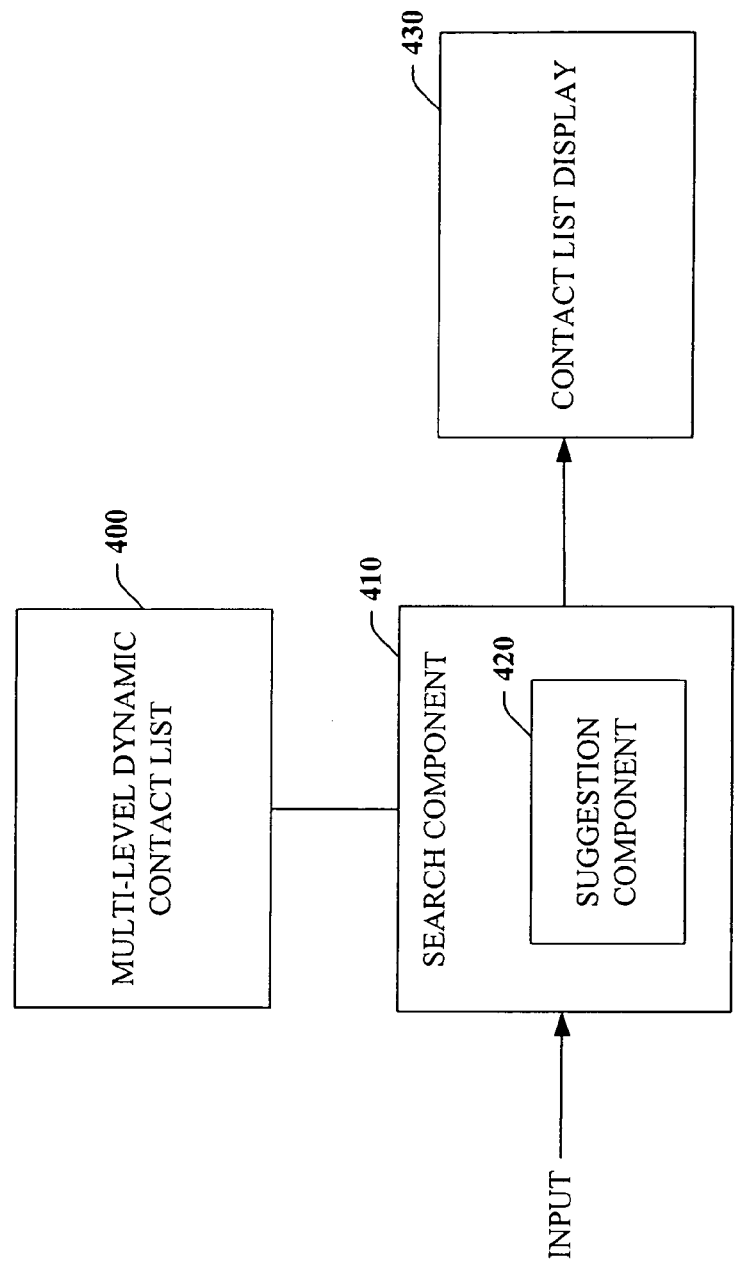
FIG. 4 is a block diagram of contact list controls employed in a message organizational and display system in accordance with an aspect of the subject invention.

Referring now to FIG. 4, there is illustrated a block diagram of a contact list control that can be employed in a message organizational and display system in accordance with an aspect of the invention. In particular, the control works cooperatively with a multi-level contact list 400 and can be characterized as a search component 410. The search component 410 can includes a suggestion component 420 that can match the first few letters of a name (input) communicated to the search component 410 and expand the contact list 400 to highlight a potential match. The expanded contact list can be shown on a contact list display 430.

Figure 5:
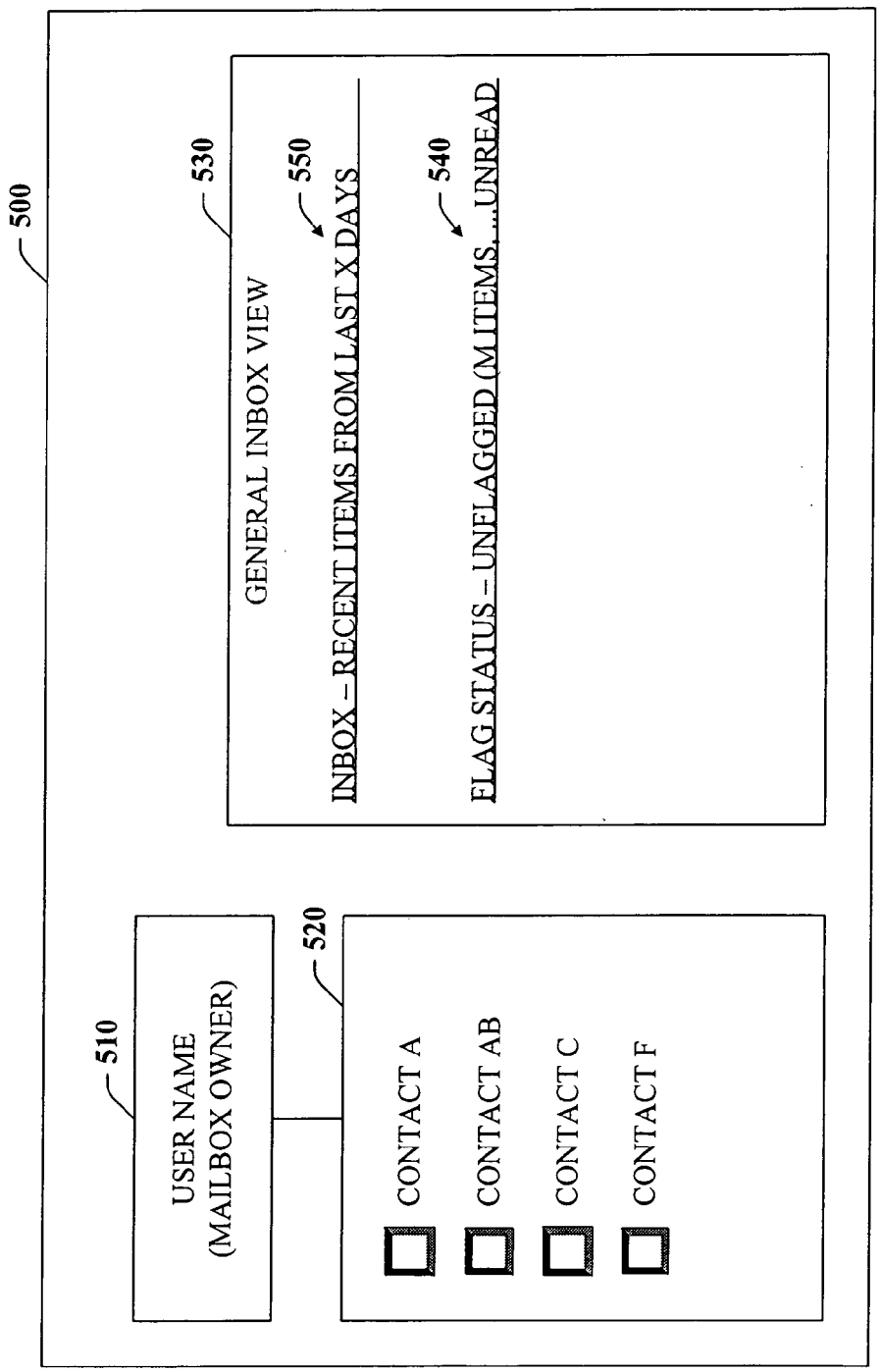
FIG. 5 is a schematic diagram of an exemplary user interface employed in a message organizational and display system in accordance with an aspect of the subject invention.

Turning now to FIG. 5, there is illustrated a schematic diagram of a user interface 500 for a message organization and display system in accordance with an aspect of the subject invention. The user interface 500 can include identification of the user 510 or mailbox owner and a list of contacts 520 associated with the user 510. The list of contacts includes any group or person that has sent or received a communication to or from the user, respectively. Communications can include emails, notifications, meeting invitations, transferred files, and the like.

The user interface can also display the user's messages in a general inbox view 530. New messages as well as messages received in the last few days (e.g., configurable by the user) can be displayed in the general inbox view 530 (540). Important messages that are not "new" but that may require additional action can be flagged by the user and moved to a different portion of the inbox (550). These messages can be "stored" there and may not be subject to an auto-archiving operation. Any other message that has been sitting in the inbox for P days (e.g., 3-5 days) can be auto-archived. Thus, they are removed from the general inbox but are stored and readily accessible via the contact list. As an alternative, the entire message store can also be searched.

Figure 6:
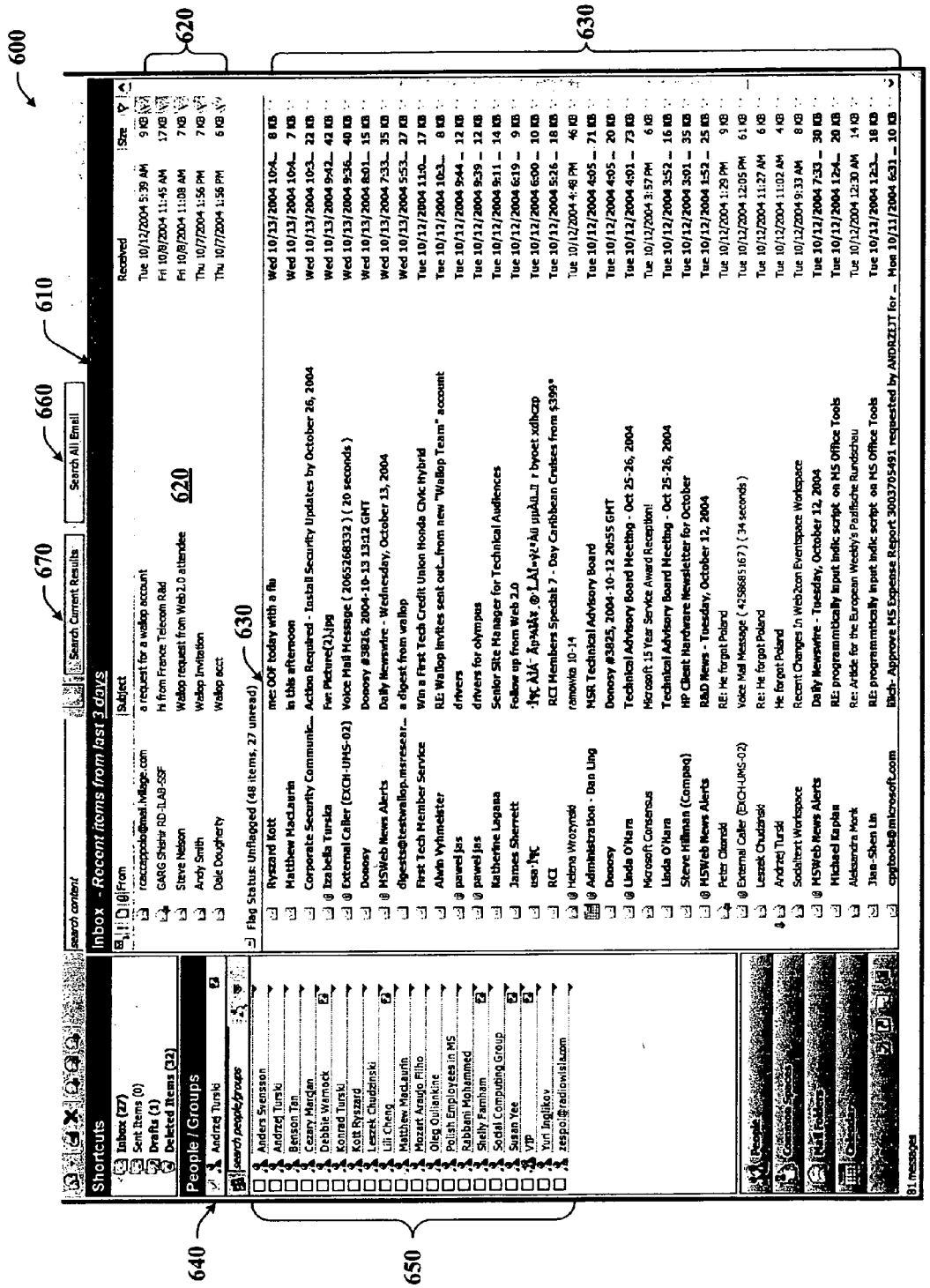
FIG. 6 illustrates an exemplary user interface for a message organizational and display system in accordance with an aspect of the subject invention.

FIG. 6 demonstrates an exemplary user interface 600 illustrating various aspects of the subject invention including those described in FIG. 5, supra. The user interface 600 displays the user's inbox 610 having recent items from the last 3 days sorted according to the flag status of the messages. The precise number of days can vary depending on user preferences. Flagged messages 620 are located on top to keep the user aware that additional attention is required for such messages. Unflagged messages 630 can be listed below in chronological or some other order (e.g., sender, subject, received date, size, etc.).

In the People/Groups section of the user interface 600, the user 640 is identified. Below the user 640 is a top-level view of a dynamic contact list 650. The contact list design represented in the figure is to show, initially, a list of the most significant contacts ordered alphabetically (e.g., top level). This offers one-step access to the most frequently used names. At the same time, all other names can be accessed by expanding the sections of the list between the top-level entries. The less significant names may require two or more subsequent expansions, but ultimately every name can be readily accessed through the same list control.

At any given time, all the contacts are presented to the user as a single, flat, alphabetically-ordered list, but with some sections folded in (e.g., as indicated by the down-arrows by each contact). The position of each name is fully predictable, as even the hidden entries obey the same alphabetic ordering. Over time, if there are changes to the relative ordering (as determined by an importance algorithm), some other contacts may come up to the top level, but the overall order of all names on the list remains uniform.

The notion of using existing entries, such as individual contacts, as catalog indices (visible at the top level) is not new. In fact, this is the standard way to organize printed dictionaries. However, in the standard dictionary approach, indices are put at the beginning and end of every page to indicate the content of that page. This can be described as a "constant distance" between consecutive indices. The words chosen for indices are not particular in any way, they just happen to be at the beginning or end of the page.

In this invention's approach, the names chosen for indices are those that are on the top of our non-arbitrary "importance" list. Using the dictionary analogy, these would be the words that are most frequently looked up. Moreover, these names are entries by themselves—clicking on any name selects it. This contrasts favorably against the standard alphabetic index, where getting to any entry is at least a two-step process.

Figure 12:
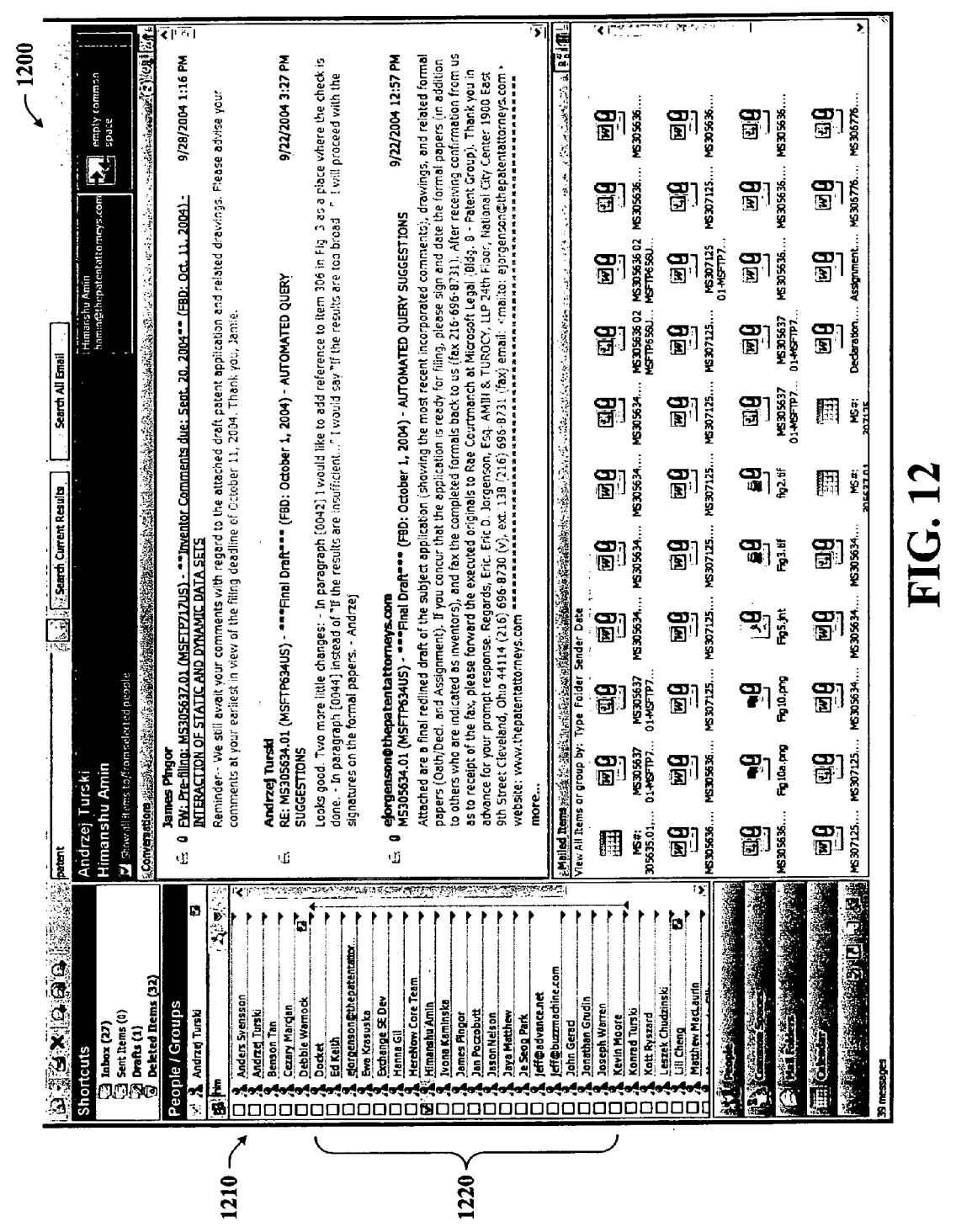

Grouping all the contacts into several tiers or levels resembles a hierarchy. Displaying a true hierarchy for a set of people (e.g., in a form of a tree view with extra indentation for each level) could be perceived negatively if it does not align with traditional business organizational structures. To avoid any such connotation, the expanded names coming into view can be shown as peers to the top level ones. However, a navigational side bar can also be employed where the tiers are color-coded. The tiers are not hidden but instead, a visual representation that can best emphasize their utilitarian character can be sought (e.g., see FIGS. 12 and 13 for illustration of color-coded tiers).

When looking for less frequently accessed names, the expansion is required only to some selected areas of the list. The total number of names visible on the list can be very limited, typically just in the tens. This allows for the effective use of screen real estate.

The user interface 600 can also include search operations that can search all messages or communications (660). Search results can be further searched as well (670).

Figure 7:
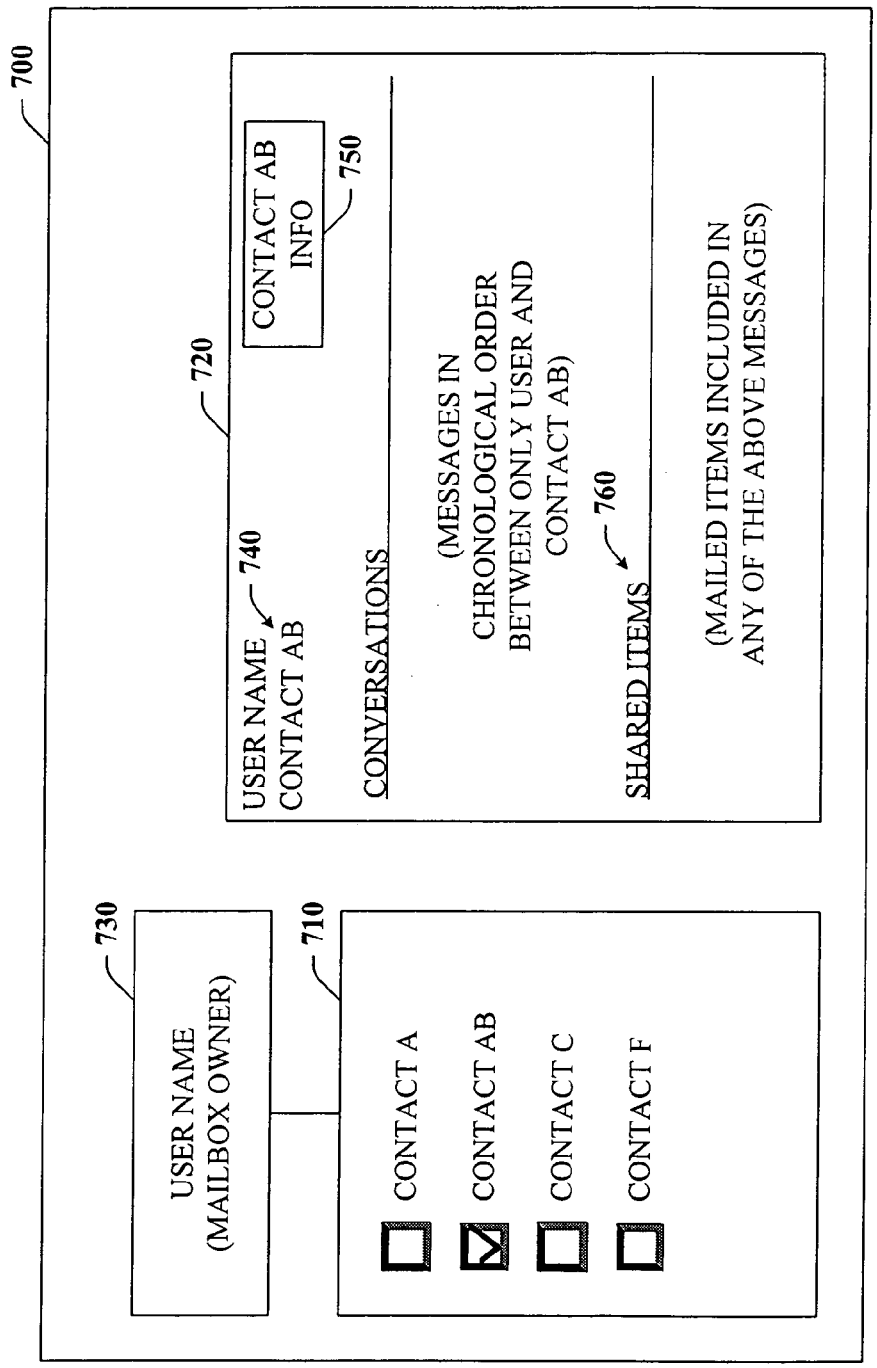
FIG. 7 is a schematic diagram of an exemplary user interface employed in a message organizational and display system after a contact has been selected in accordance with an aspect of the subject invention.

Referring now to FIG. 7, there is illustrated a schematic diagram of a user interface 700 following the selection of a contact (Contact AB) from the contact list 710. By selecting Contact AB, the general inbox view 530 (FIG. 5) is replaced by a message window 720 that includes all communications between only the user 730 and the selected contact (Contact AB). To clearly identify the content of the message window 720, the parties associated with the communications shown in the message window can be listed at the top of the window (740). Information 750 about the selected contact can also be included in the window 720 or elsewhere on the display. The information 750 can include the person or group's email alias, email address, phone number, address, etc.

Messages and/or any communications between the user and selected contact can be viewed in a conversation mode. In addition, any information shared in the communications such as attachments, hyperlinks, and the like can be displayed in a space designated for shared items 760.

Figure 8:
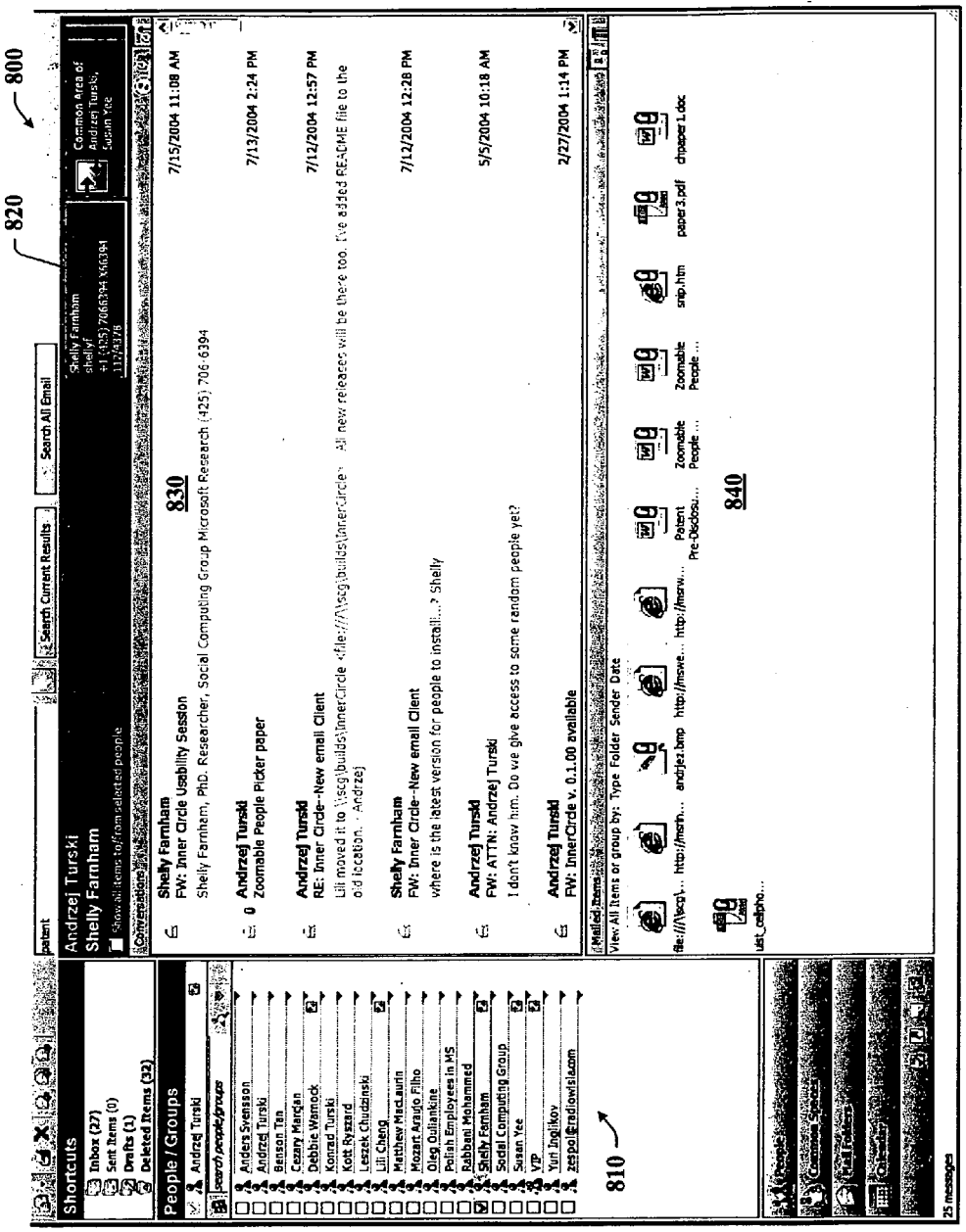
FIG. 8 illustrates an exemplary user interface for a message organizational and display system after a contact has been selected in accordance with an aspect of the subject invention.

In FIG. 8, an exemplary user interface 800 that reflects the diagram of FIG. 7 is depicted. As can be seen in the contact list 810, "Shelly Farnham" has been selected by the user "Andrzej Turski". Thus, the general inbox view has been replaced with a person/group view of all communications between Shelly and Andrzej only.

By selecting at least one contact from the list 810, the user can focus on a specific person. A group of people can be chosen either by selecting a people list entry that represents a group (i.e., email distribution list) or by marking multiple checkboxes on the list. Clicking directly on the entry name selects that entry only (clearing all other checkboxes). However, clicking in the checkbox area allows turning checkboxes on and off and creating an ad hoc group. The precise operation of selecting the checkboxes and entry names can vary depending user option selections.

For the selected person (or the last person added to the group), profile information 820 including the alias name, phone number, and office location can be displayed. Other information can be shown as well depending on its availability and whether the user desires to view it. The full profile containing all the details of the person or group can be accessed in the address book (e.g., by clicking on the person or group name).

In general, people-based message organization facilitates presenting the items known to all members of the selected group (e.g., the common knowledge within the group). Even if only a single person is selected, the mailbox owner is implicitly involved in all the communications stored in his/her message store—hence, a two-person group results.

The communications are displayed in a conversational view (820). In addition to offering any of the standard inbox views, the conversational view can be selected to visualize a set of messages associated with a group of people. The messages involving the same group tend to be related to each other. Even if they do not belong to the same message thread, they may discuss similar topics and contain mutual references. Essentially, they form a continuous "conversation," to a much greater extent than messages flowing in the inbox from random people.

The conversational view can be more applicable to current email users for other reasons as well. For instance, another common tendency, as observed in many users' inboxes, is a shift from long email messages (letter style) to a sequence of short messages and responses (instant messaging style). Short and quick messages gain popularity as email becomes faster and more ubiquitous. The whole sequence of short messages and replies is often needed to fully understand the conversation.

In the conversational view, the messages involving the selected people can be displayed as one long conversation (time-ordered)—similar to the way conversations are displayed in instant messaging clients. For each message, the time, sender, subject, and the full message body expanded in place can be shown. Only the largest messages (e.g., >1500 characters) have the message body truncated (e.g., indicated by more . . . button).

In addition, the original text formatting may be dropped to display all the message content in a uniform way as plain text. Finally, for messages that are replies or forwards, we only include the new text added by the last sender. Of course, any message can be opened and viewed in its complete original version by double clicking the message header. Moreover, the conversational view is a convenient way to look at email discussions within the group. Showing all the messages sent around the same time together facilitates understanding the context for each individual message.

As an aside, when showing messages associated with a selected person or a group, the subject invention can search across all folders and message stores. For example, if the email profile includes connections to multiple email transports (e.g., Exchange, POP, IMAP, HTTP), then one or more components of the invention can unify messages coming to the selected person or group from all possible sources. Moreover, contact list entries may define multiple email addresses associated with a single person. Communication involving any of these addresses is associated with the person. Therefore, the subject invention can perform a true unification of email communications with the selected group through various connections or email accounts.

The user interface 800 in FIG. 8 also includes a Mailed Items area 830. This area 830 provides a separate view of all the mailed items shared between Shelly and Andrzej. In particular, all the file attachments and all identified Web and file links extracted from the body of the message can be presented. In addition, the Mailed Items area 830 includes the appointments involving all the selected people. Alternatively, the appointments can be shown in a calendar view as shared calendar events.

Each item in the Mailed Items area (except for appointments) is associated with the message it came from. This association is important, since in many cases the message provides the context needed to understand the item origin or meaning. Even if the mailed items are shown separately from messages, a two-way link is maintained between them. Selecting any of the mailed items automatically scrolls the message list and highlights the parent message (e.g., FIGS. 17-19, infra, for demonstration). Conversely, selecting the message highlights the items within.

As the number of mailed items grows large, it becomes useful to organize them in some way. The four most common item properties: item type, sender, send date, and parent message folder, can be employed as the grouping properties. When grouping by any of these properties is activated, the items can be divided into clusters that share the same property value. For example, by grouping by item type, one may easily find all items of type Word Document (e.g., FIGS. 17-22, infra, for illustration). This method of item grouping can replace and/or enhances the traditional folder structure of the file system.

Figure 9:
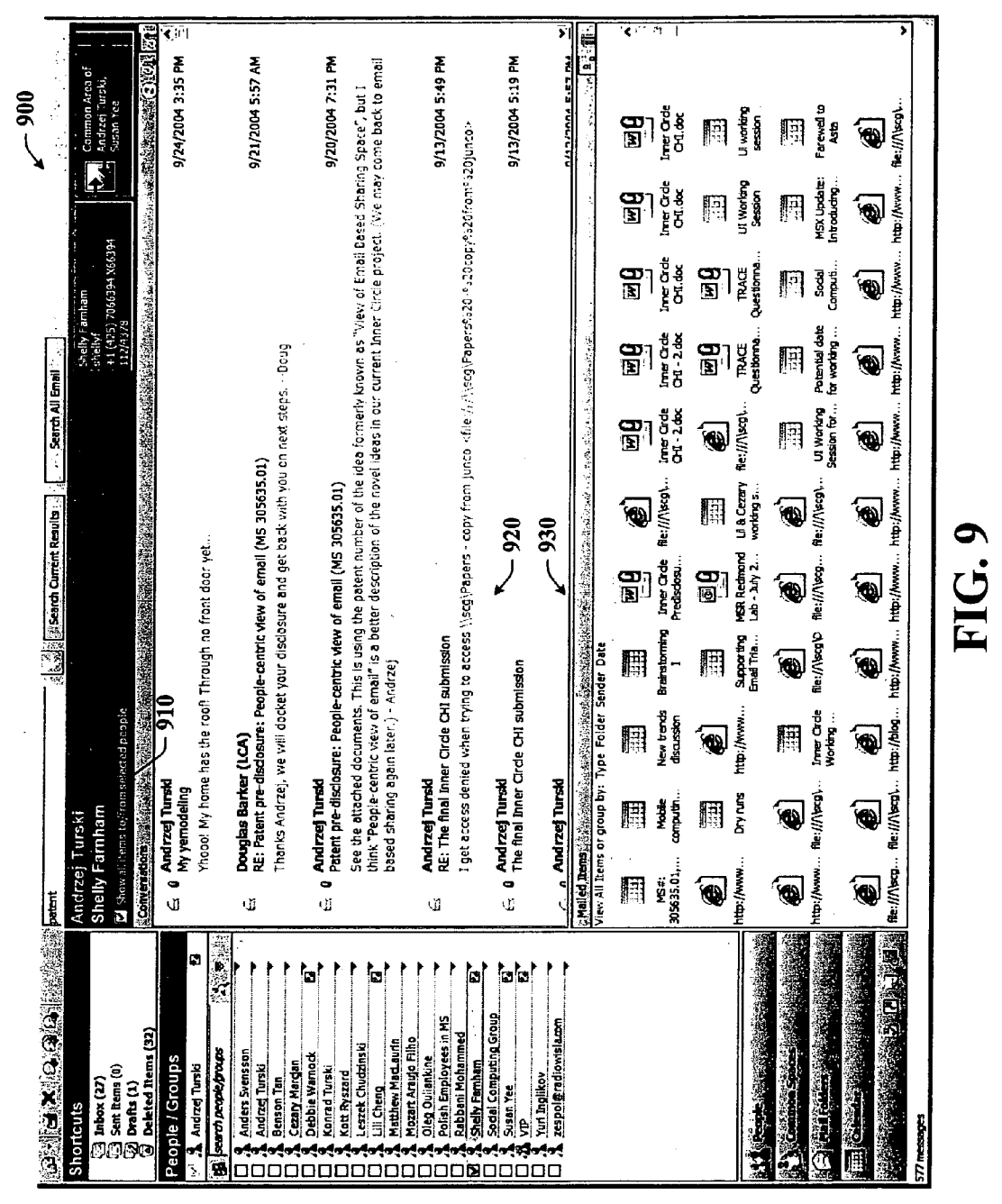

In a broader sense, the common knowledge within a group (e.g., user and selected person) may include communications with third parties. This can however include a lot of spam. A narrower interpretation limits the view only to messages exchanged within the group—as depicted in FIG. 8. According to the user interface 900 in FIG. 9, the subject invention can support both models: a checkbox 910 below the currently selected person or people labeled "Show all items to/from selected people" allows the user to decide whether the third party communications should be included or not. In contrast with FIG. 8, the user has selected the checkbox in FIG. 9. As a result, many more messages 920 as well as shared (Mailed) items 930 are displayed.

Figure 10:
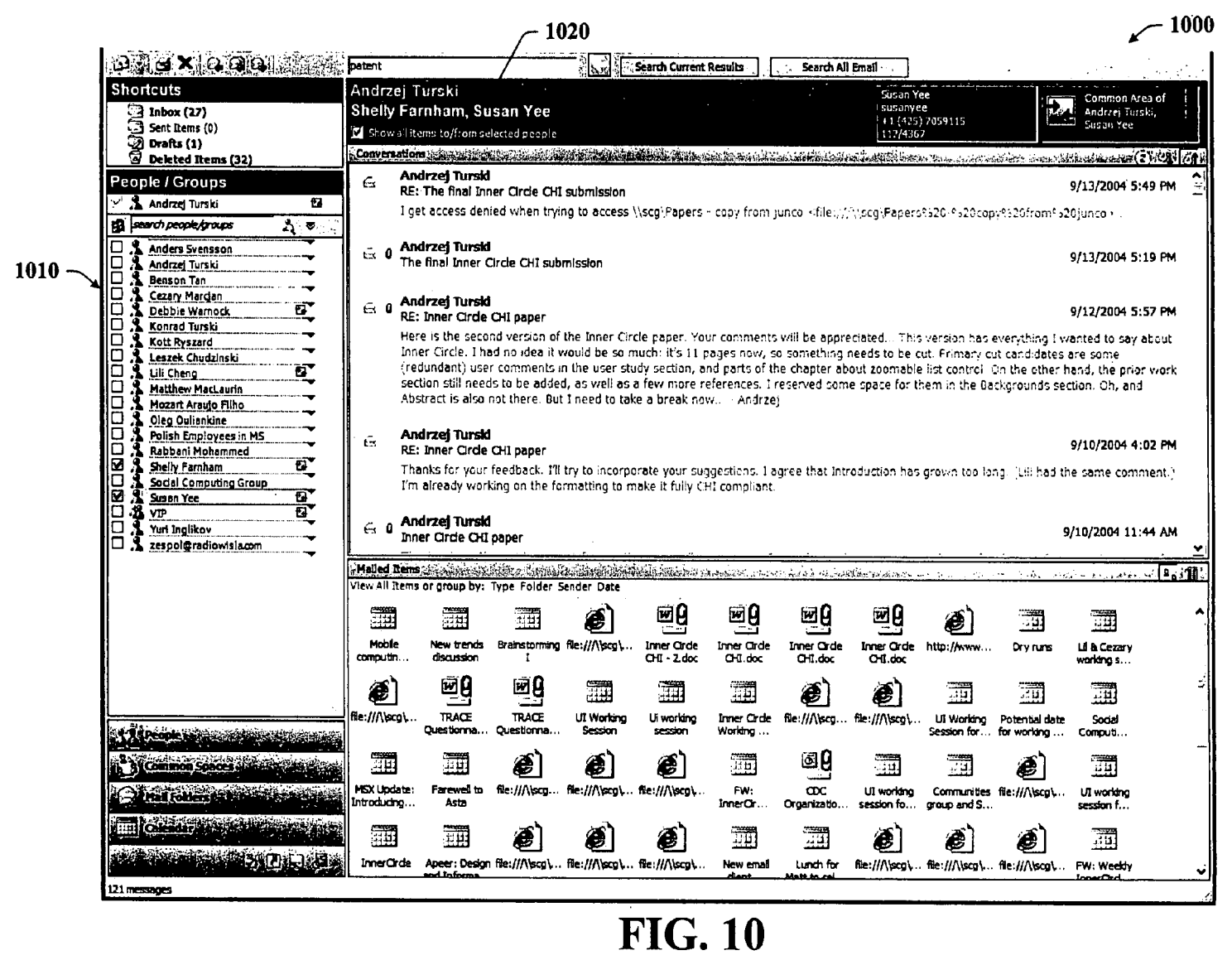

Moving on to FIG. 10, the user interface 1000 presented therein demonstrates the selection of more than one person from the contact list 1010. In particular, both "Shelly Farnham" and "Susan Yee" are selected (as evidenced by their checked boxes). Consequently, Susan Yee has been added to the list of selected contacts (1020) in the message view window. Because she may have been the last person selected, her profile information 1030 can appear as well. To view Shelly's information again, the user can simply click on Shelly's name (1020) in the message view window. Messages displayed in the message window can presumably include Andrzej, Shelly, Susan as well as any other third party—since the checkbox is checked to show all items to/from the selected people.

Turning now to FIG. 11, there is a schematic diagram that illustrates a click-by-click sequence of a zoomable contact list that can be utilized in a message organization and display system as described hereinabove. Level 1 (1100) shows the people most connected in terms of communication activity with the user (not shown). When the user clicks on a down-arrow next to a contact in Level 1, an additional level 1110 (Level 2) is revealed. By clicking on the down-arrow next to "Cezary Marcjan", contacts in the next tier ($2^{nd}$ tier) occurring between "Benson Tan" and "Cezary Marcj an" are now visible. To zoom in again, the user can click on the down-arrow next to "Bill Mauer" to reveal the $3^{rd}$ tier 1120 (Level 3) of contacts present between "Bert Kleewein" and "Bill Mauer". Additional zooming can be performed where there appears a down-arrow. As each lower tier is expanded, a navigation bar can be found along one side of the opened tier. To zoom out of each tier, the navigation bar can be clicked on.

To complement the browsing and navigation actions (e.g., zooming, expanding, etc.), an incremental search function can be employed. In a standard approach to such a feature, keying 'M' would jump to the first entry starting with the letter 'M'. Pressing 'M' again would summon the second entry, and so on. Such an approach, however, might poorly complement the zoomable contact list, since the entries starting with 'M' might be hidden.

In the subject invention, pressing 'M' goes to the first entry with the letter 'M', on the highest level where there exists such an entry. It expands the hidden entries as necessary. Effectively, it selects the "most important" person starting with the letter M; or if there are a few people with a similar importance level, it selects the first one, but the other ones also come into view.

If one consecutively presses a few letters, the incremental control performs an incremental search for entries starting with these letters. For example, typing "TIM" finds entries starting with "Tim". An aspect of the user interface 1200 in FIG. 12 demonstrates this control and search function. In the figure, the user has typed in "HIM" 1210. The "most important" person starting with "HIM" appears in a second level 1220, thus causing the contact list to expand where the entry occurs. In the standard approach, it jumps between entries starting with 'T', 'I', and 'M'. The search mode is reset if one does anything other than typing a letter (e.g., clicking on an arrow key or a mouse button). Once the search mode is cancelled, one may start a new search for another name.

The desired entry is in fact "Himanshu Amin". When the user selects this contact, the message view can change to show all communications between Andrzej and Himanshu (and other third parties—due to the checked box to show all item . . . ). In addition to the incremental search that tries to match the starting letters only, a regular text search can be employed. The regular search can match a substring in the entry name or its property (e.g., any of the contact's email aliases). The entries found through the text search are displayed using the same zoomable list algorithm (i.e., the most important names are shown first).

Figure 13:
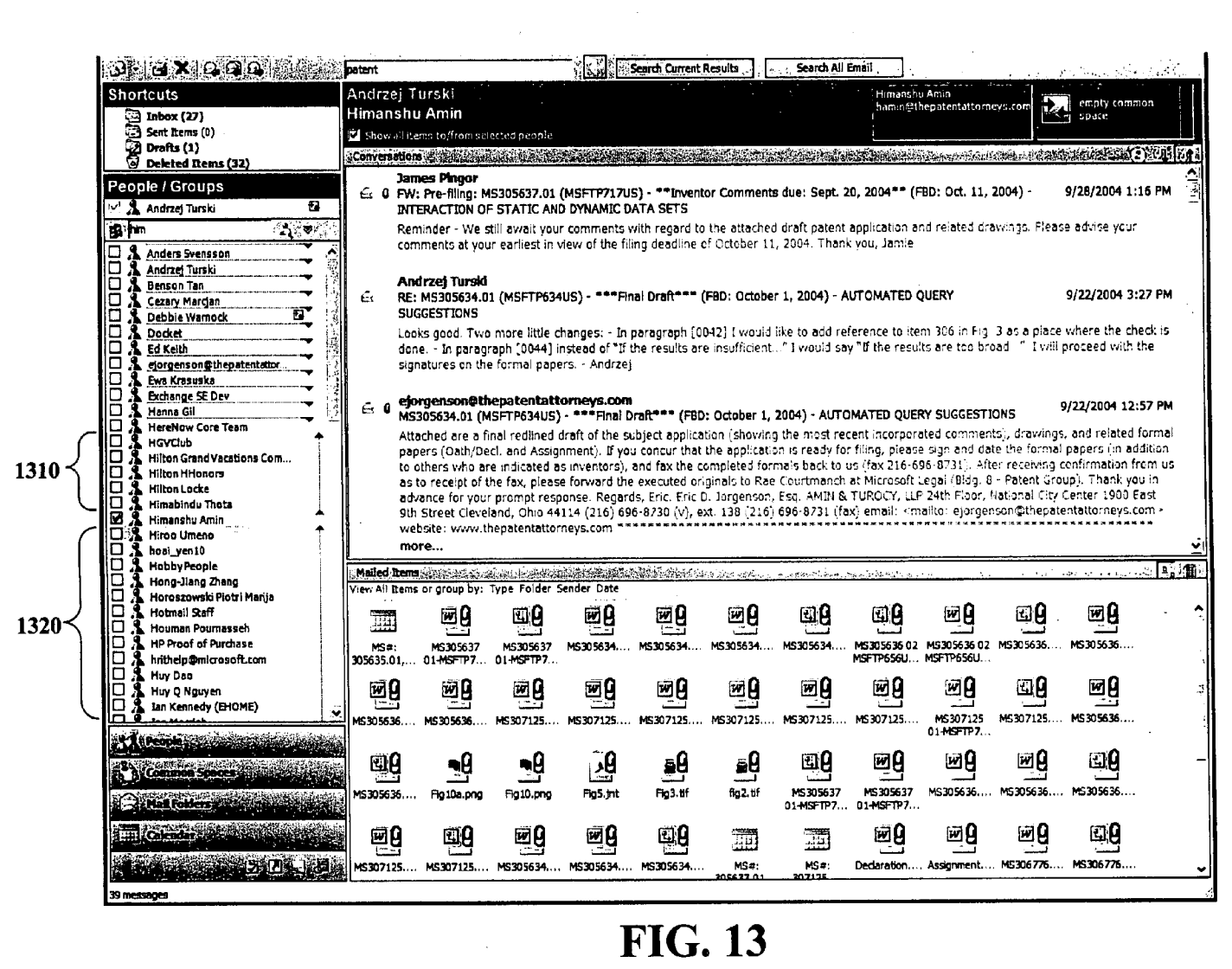

FIG. 13 illustrates a further zoom into the contact list to see the lower level contacts that come before 1310 and after 1320 "Himanshu Amin" alphabetically. As can be seen, there are lower level contacts that begin with "HIM" as well (e.g., "Himabindu Thota"), but were not shown earlier since the user's desired contact was found at an upper level.

Figure 14:
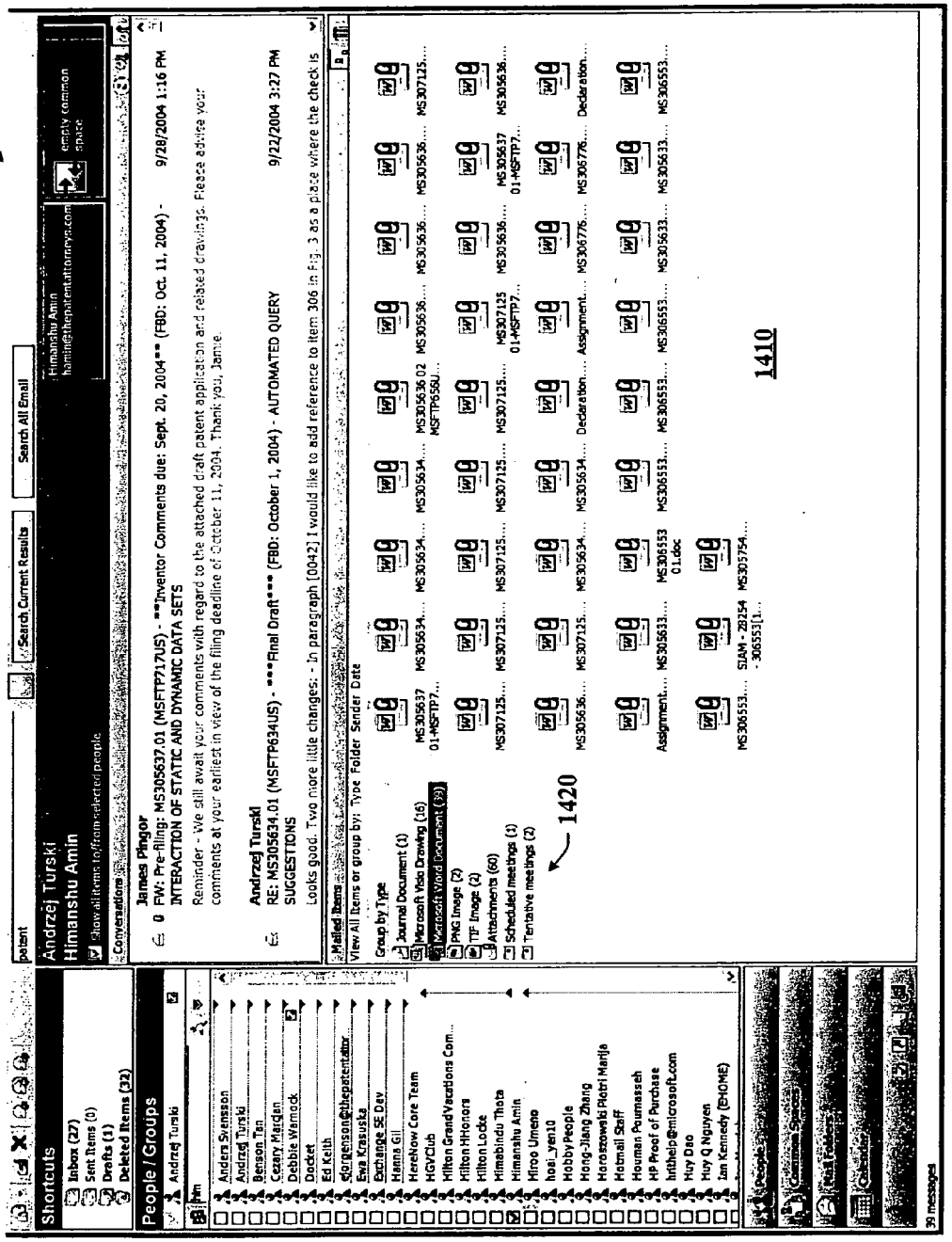
FIG. 14 illustrates an exemplary user interface of an alternative view of a shared space employed in a message organizational and display system in accordance with an aspect of the subject invention.

In FIG. 14, an exemplary user interface 1400 depicts a change in the view of the mailed items area 1410 from FIG. 13. In FIG. 13, all Mailed items were shown. Now in FIG. 14, they are grouped by type (1420). Thus, to view a desired type, the user can select any one of the listed types. For example, the user selected "Microsoft Word Document (39)" and consequently, the 39 documents are displayed in the area 1410. All other types of mailed items are "hidden" from view temporarily.

It should be appreciated that only those mail item types that actually exist for the selected people are available to view by the user. That is, if there were no "Scheduled Meetings", then this type would not be shown in the Group by Type area 1420. Alternatively, all types can be viewed but if no objects or files actually exist, a "(0)" notation is indicated.

Figure 15:
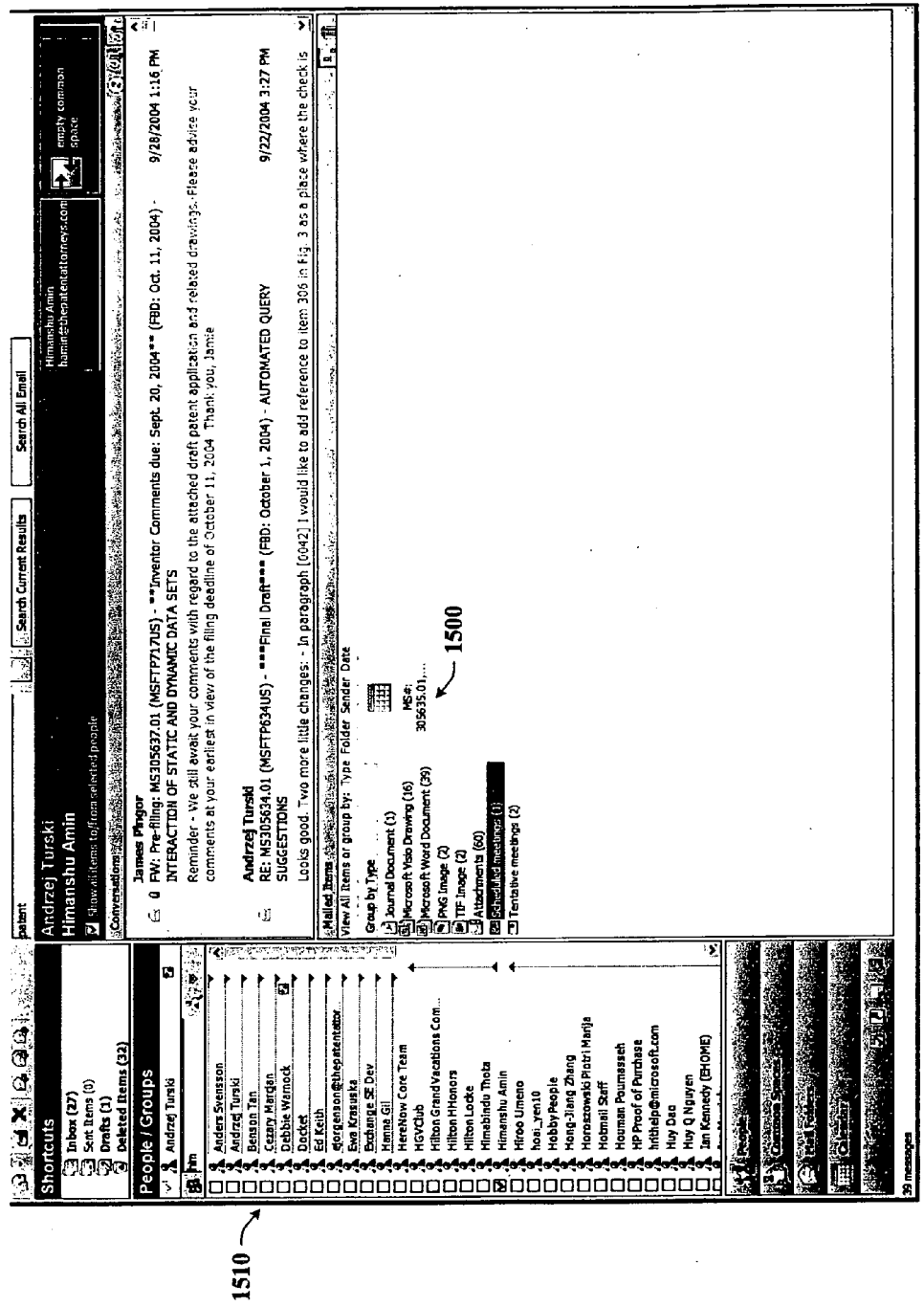
FIG. 15 illustrates an exemplary user interface of an alternative view of a shared space in accordance with an aspect of the subject invention.

From FIG. 14 to FIG. 15, the user has selected a different group by type: "Scheduled Meetings (1)". The one mailed item 1500 corresponding to a scheduled meeting is visible.

Figure 16:
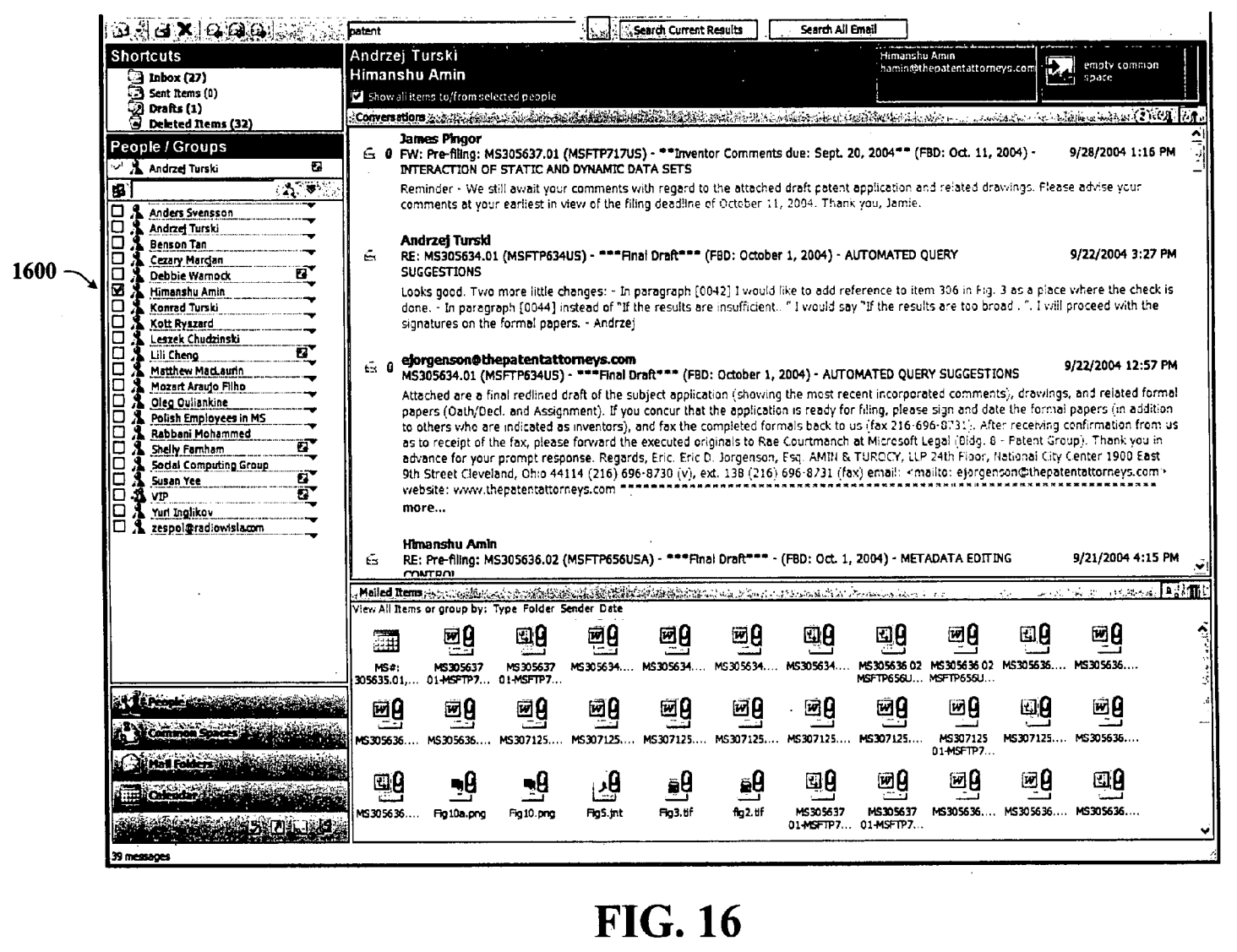

From FIG. 15 to FIG. 16, the user has collapsed the expanded contact list 1510 (FIG. 15), while keeping "Himanshu Amin" selected (checked box). In FIG. 16, "Himanshu Amin" now appears in the top level of the contact list 1600. One of the interesting features of the zoomable list is its ability to rearrange itself dynamically to show a different set of entries on the top level. For example, as in the case of "Himanshu Amin", the user can expand the list and select one of the lower ranked entries. The (fully or partially) expanded list includes many other lower ranked entries that are not interesting at this time. Therefore, the user clicks on the collapse button to reduce the screen clutter.

When collapsing the list, the user does not want lose any of the selected (e.g., marked with a check mark) entries from his/her view. Thus, the selected entries can be added to the top level tier, thereby either increasing the number of items in the top tier or causing the least important among the other entries to be removed. Following, the zoomable list can be repopulated or rebuilt using the new set of top level entries. This technique allows the user to manipulate the list to keep it relevant in all possible situations and at the same time, to keep it very compact.

Figure 17:
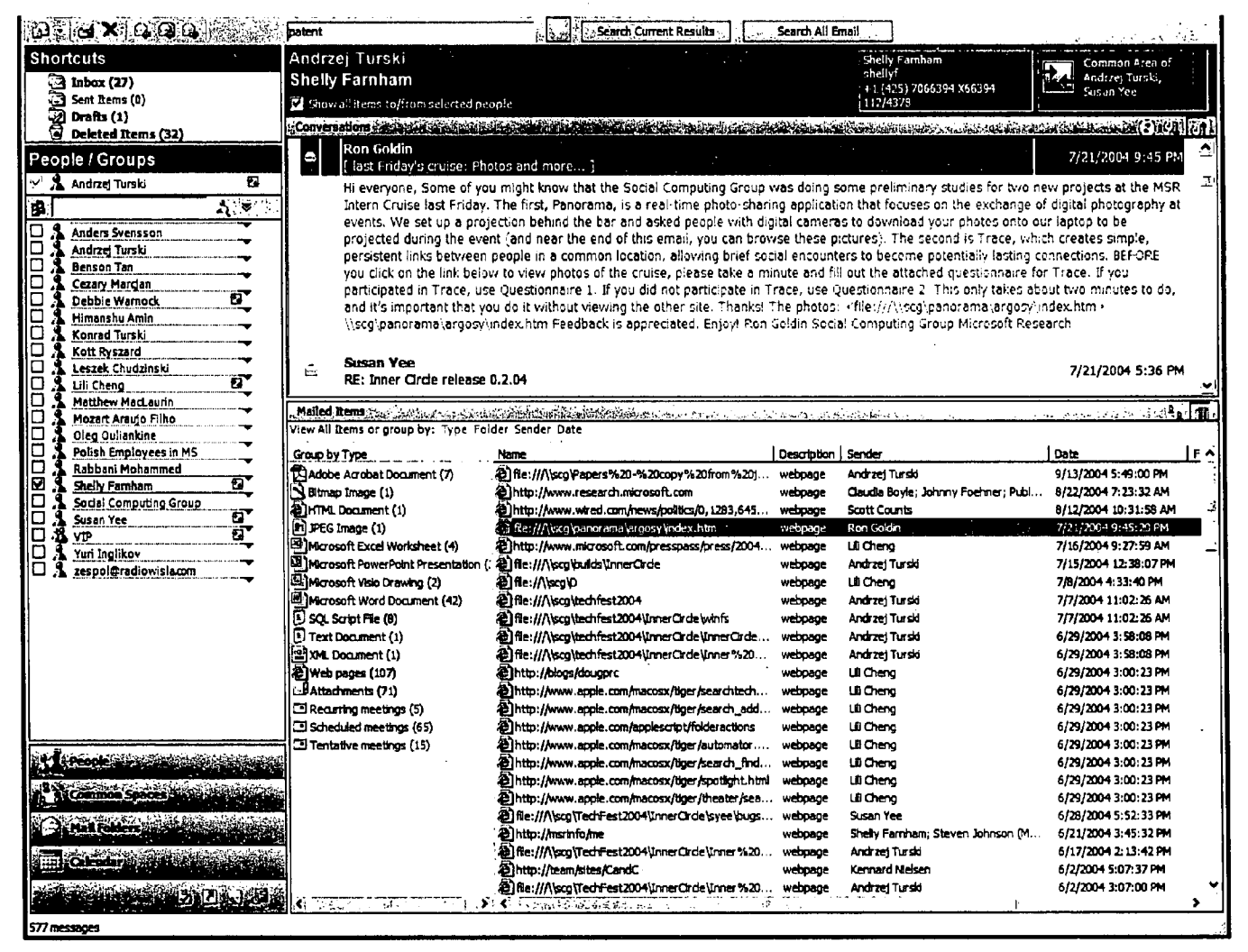
Figure 18:
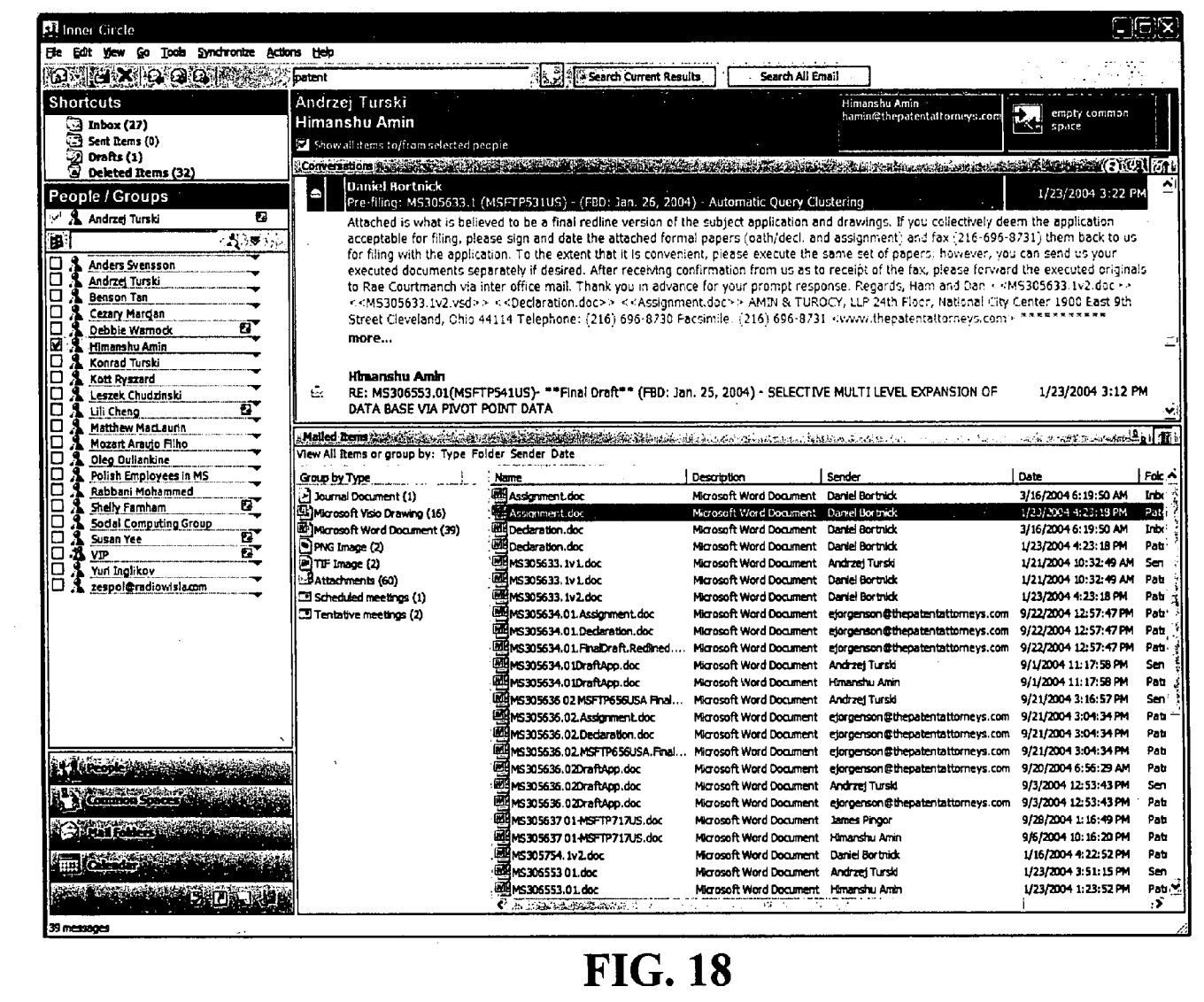
Figure 19:
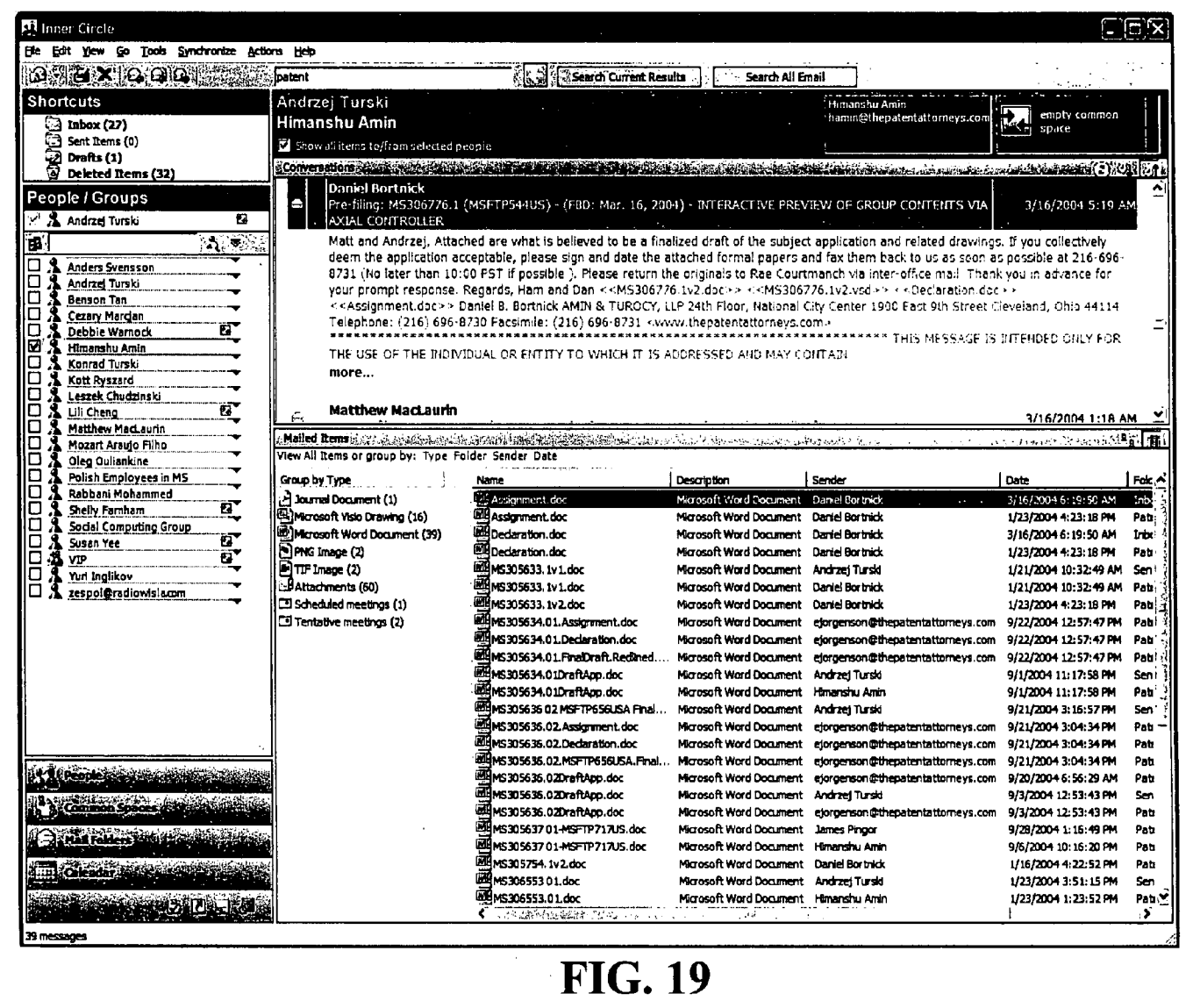

Moving on to FIGS. 17-19, the two-way link between the mailed items and the corresponding messages is illustrated. In each of the figures, the user is viewing the mailed items in a grouping by type. A particular type is selected (e.g., Web pages in FIG. 17). Thereafter, one of the 107 web pages is highlighted which then brings up the relevant message (e.g., from Ron Goldin). As shown in each of the figures, the relevant message is highlighted for quick recognition by the user.

Figure 20:
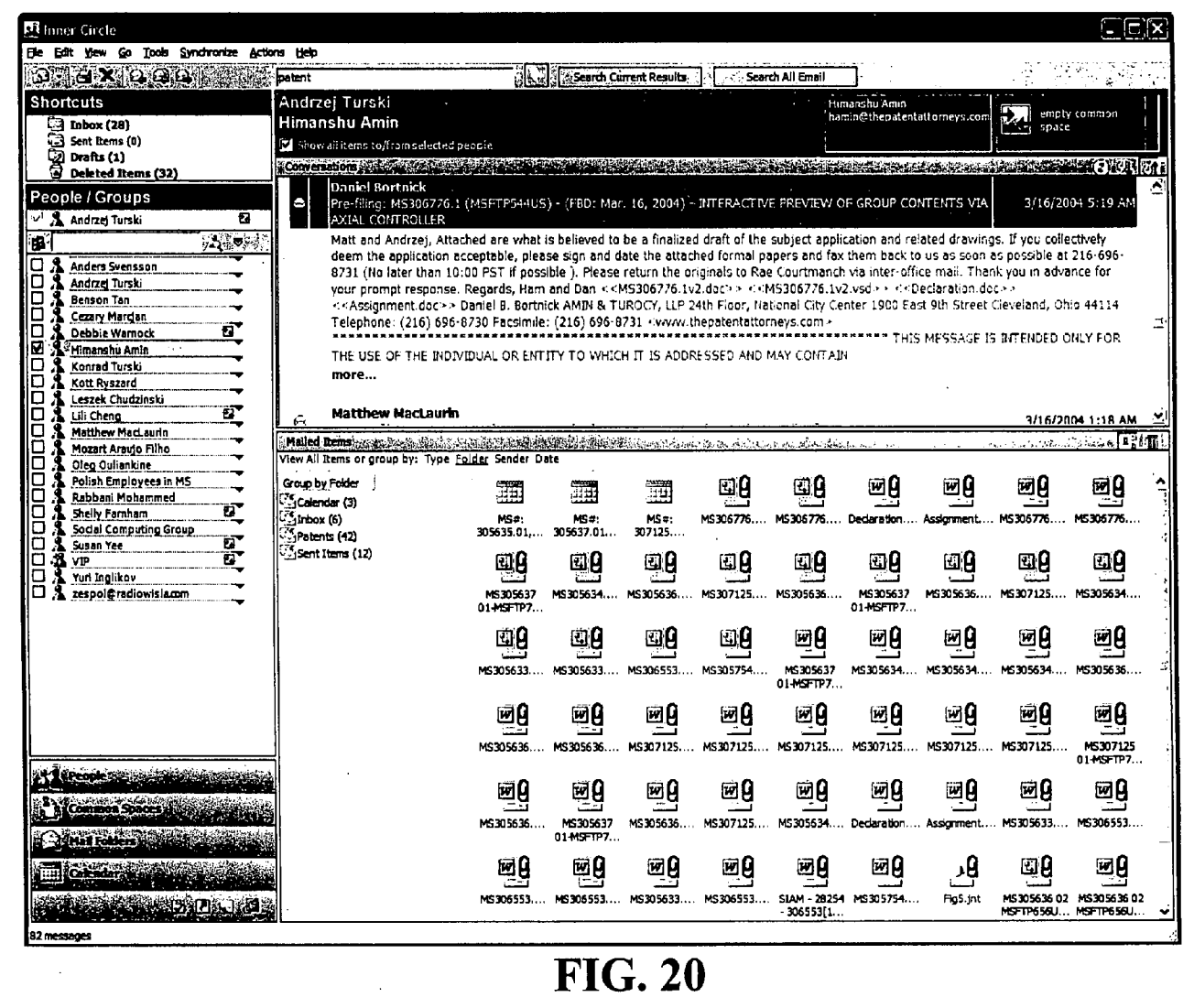
Figure 21:
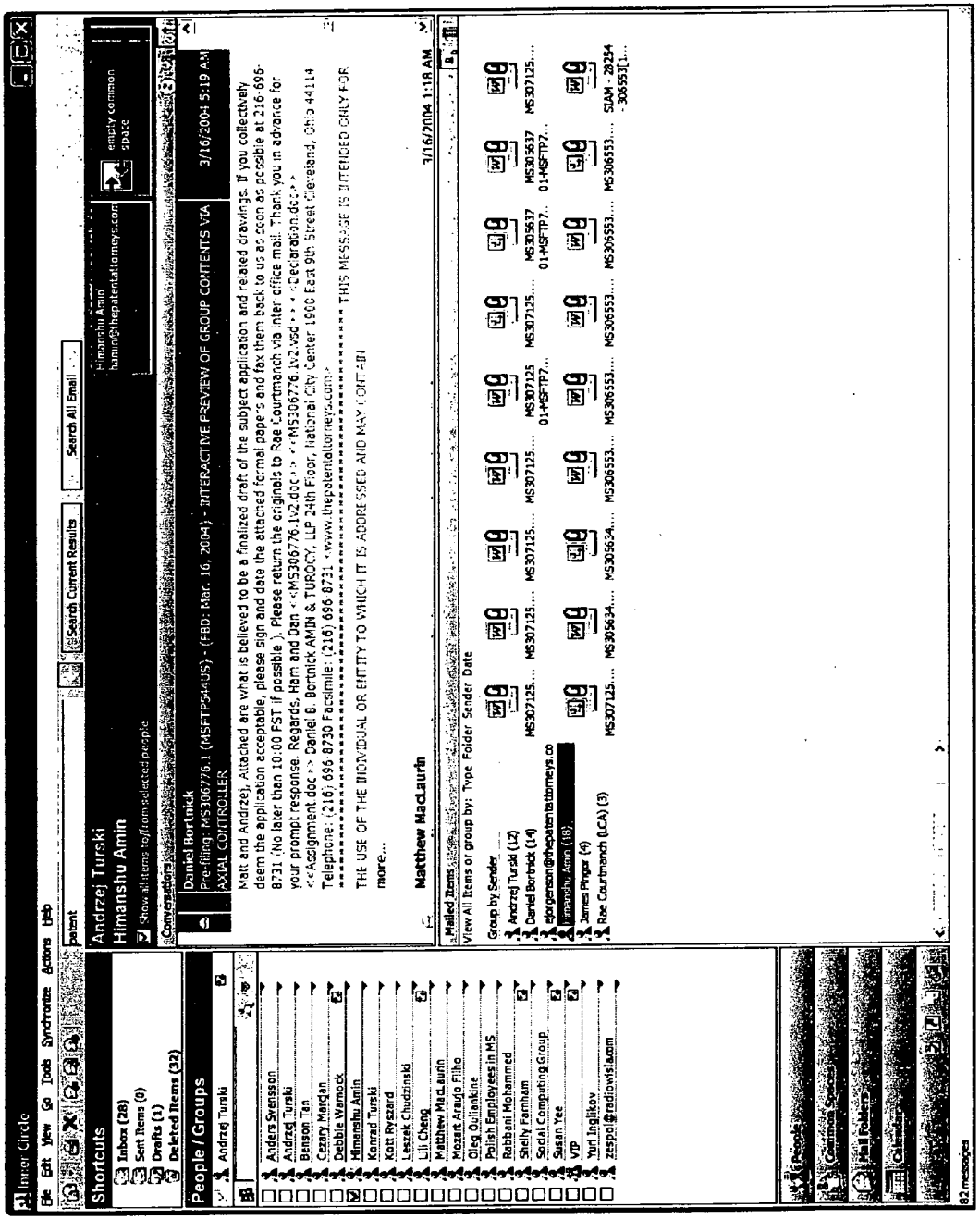
FIG. 21 illustrates an exemplary user interface for a message organizational and display system that allows a user to browse through a shared space by a sender grouping in accordance with an aspect of the subject invention.
Figure 22:
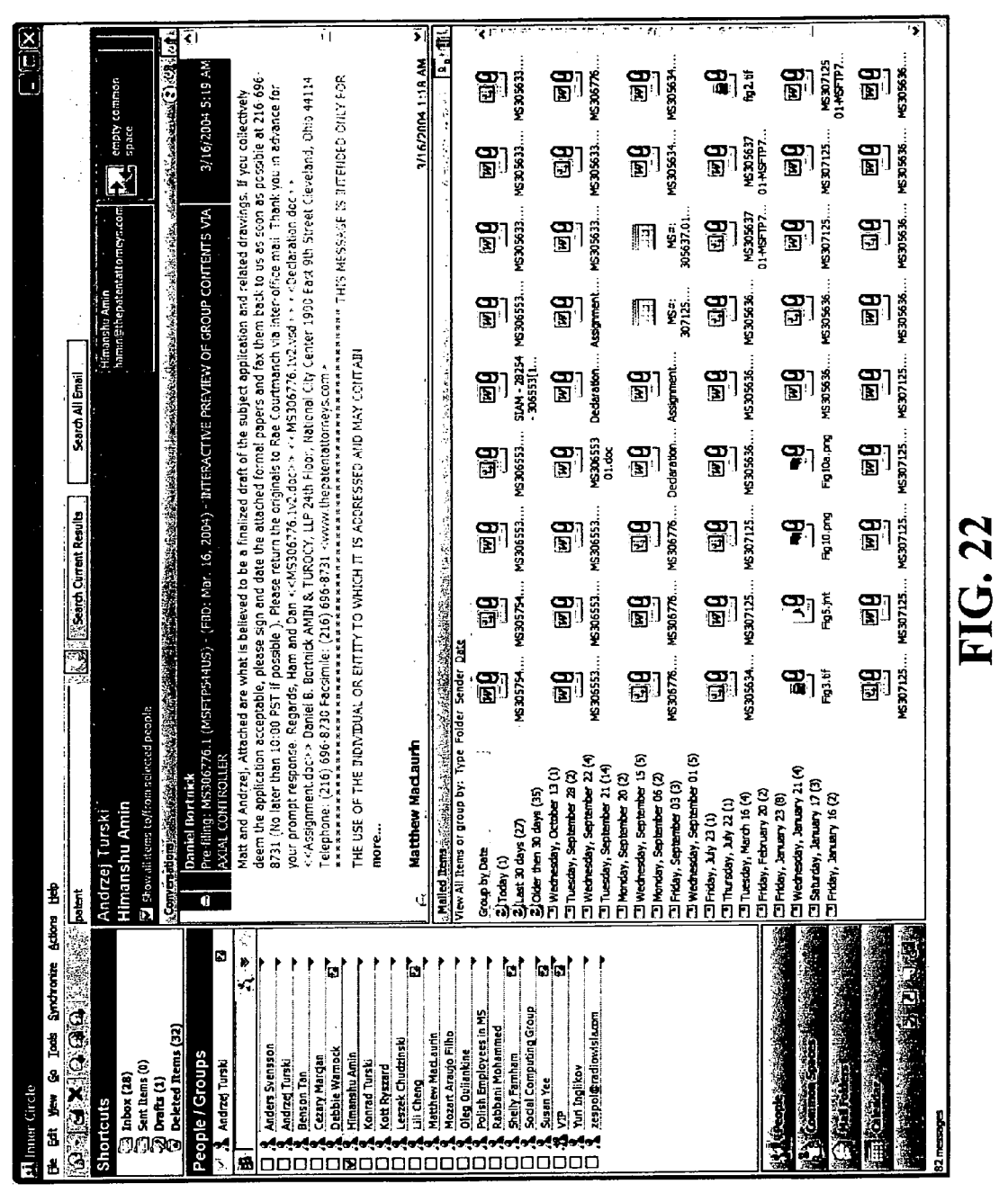

FIG. 20 demonstrates the user's ability to browse through the mailed items via a grouping by folder. Such folders can be created in the messaging (email) system as well as is typically done with current email clients. FIGS. 21 and 22 show the user browsing through the mailed items via a grouping by sender and by date, respectively.

Figure 23:
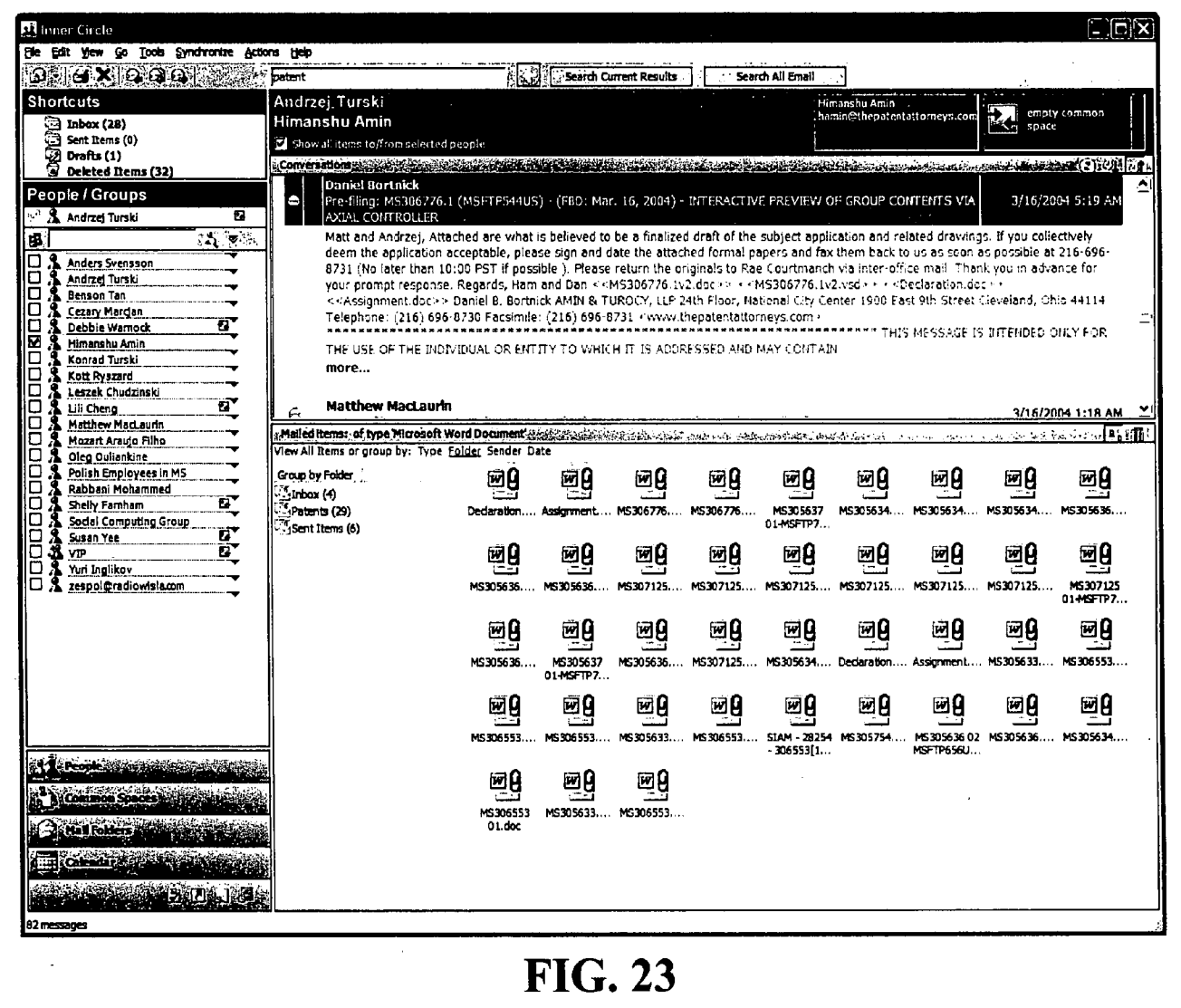
Figure 24:
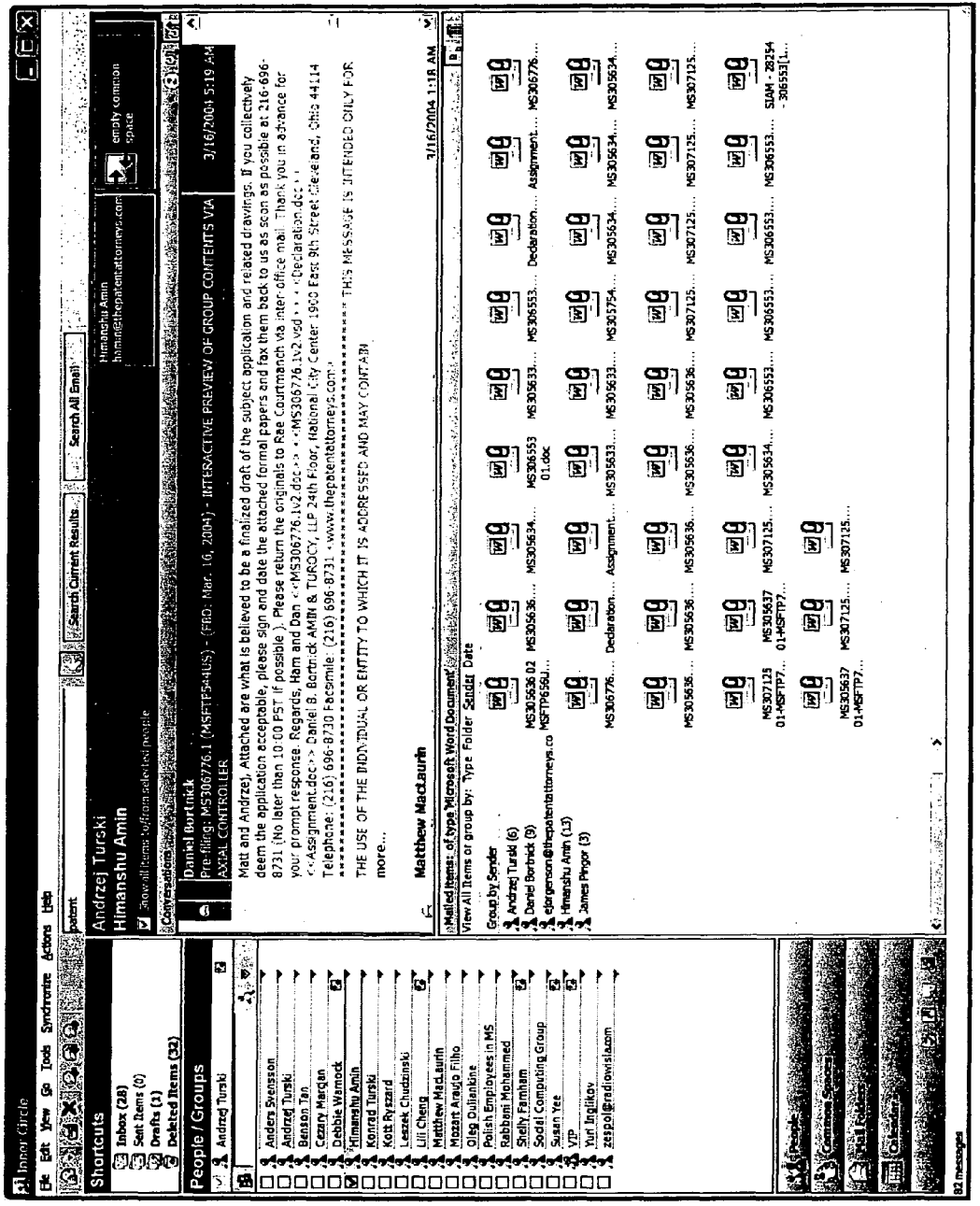
Figure 25:
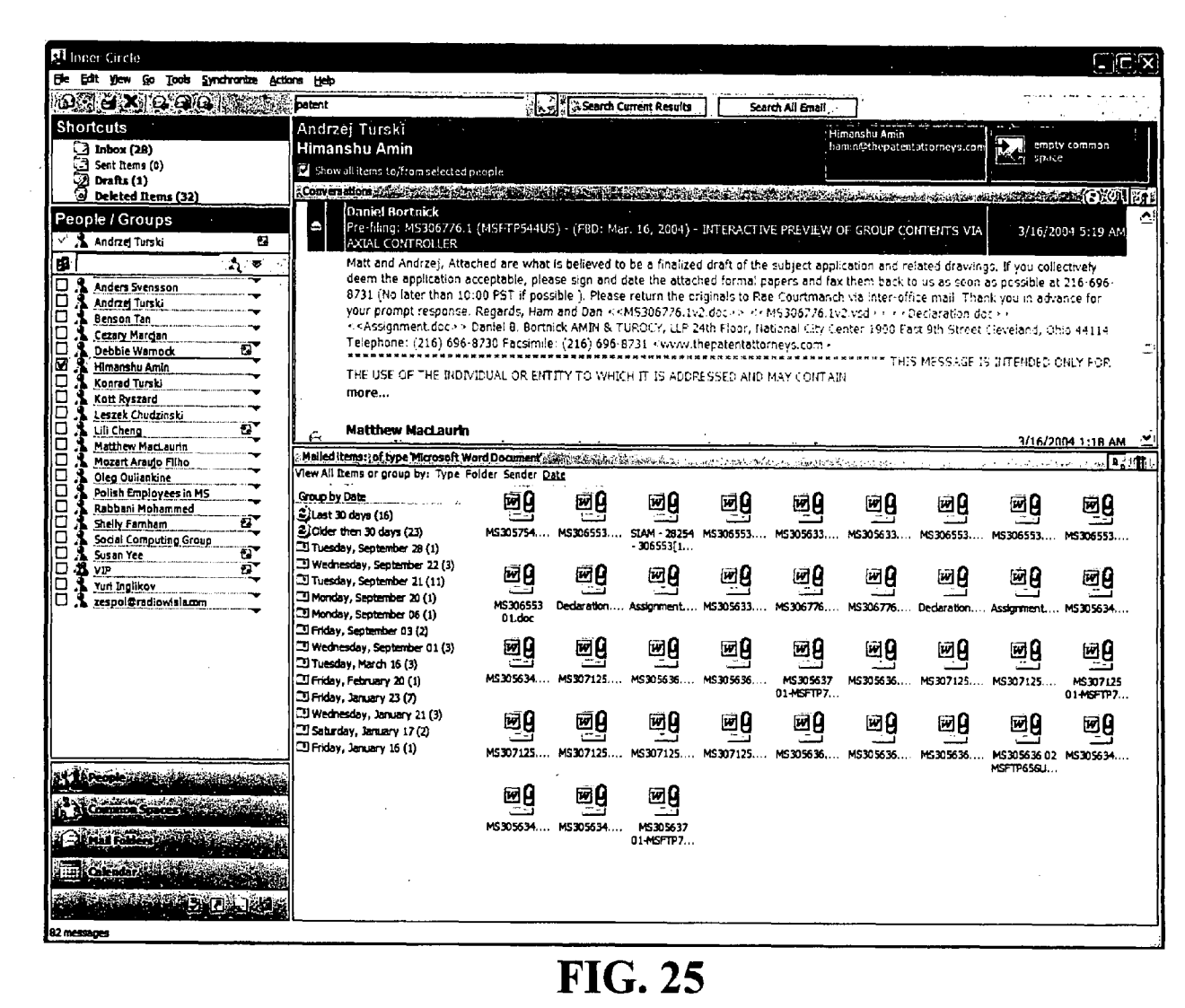

FIGS. 23-25 depict yet another technique for browsing and/or filtering the mailed items displayed in the space. In these figures, the user has specified to only see a type of Mail item (e.g., Microsoft Word Document). Furthermore, the user can still browse by groupings. Thus, in FIG. 23, the user desires to see only mail items of type: Word Documents that are grouped by folder; in FIG. 24, only mail items of type: Word Documents that are grouped by sender; and in FIG. 25, only mail items of type: Word Documents that are grouped by date.

Figure 26:
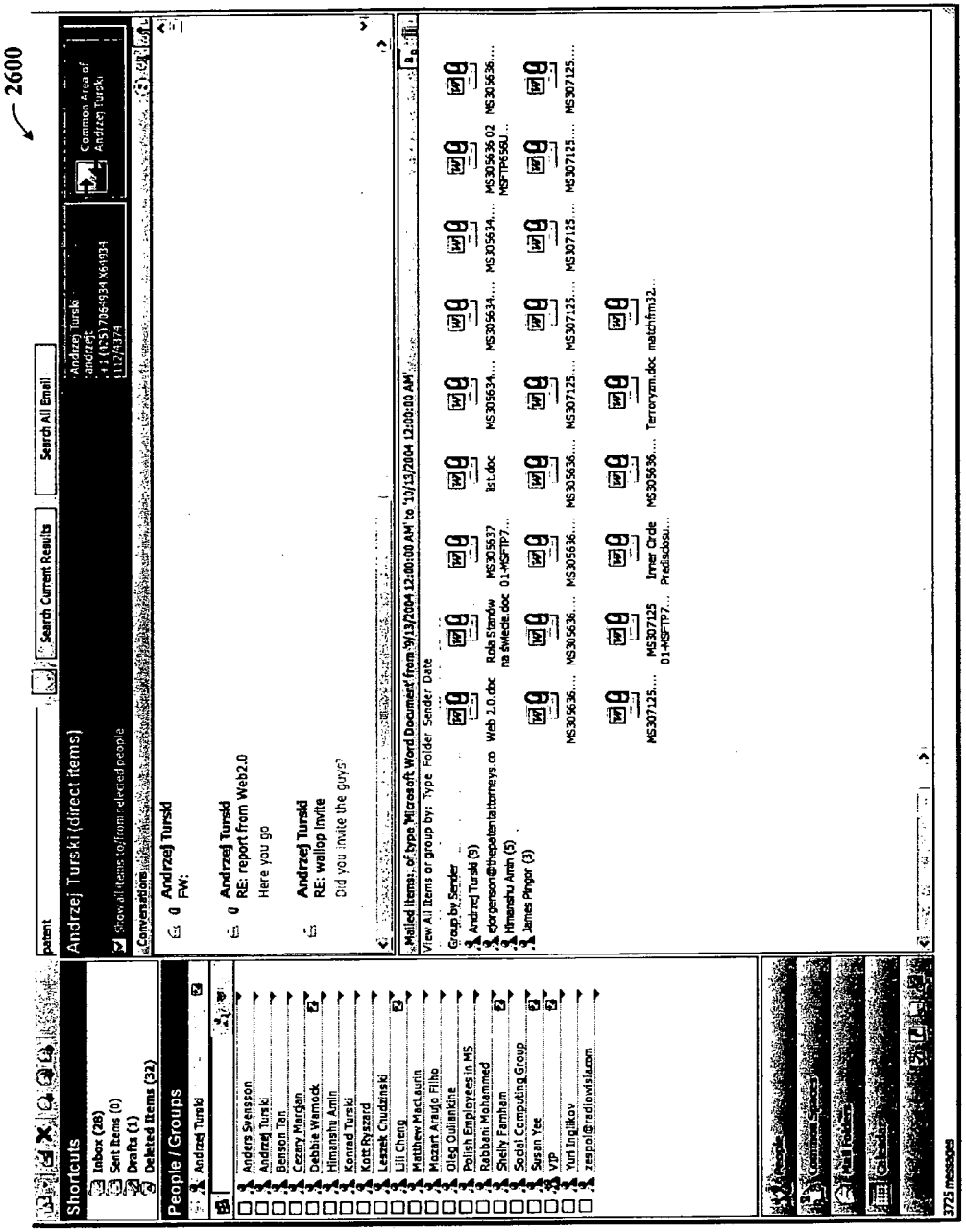

Turning now to FIG. 26, an exemplary user interface 2600 is shown when no other contacts are selected—except for the user or mailbox owner. Recall that the entry for the mailbox owner is shown separately on the top of the contact list and always selected. If only the owner entry is selected, and the third party checkbox 2610 is not checked, the view shows the owner's private items (e.g., items that do not involve anybody else). This turns out to be a very useful concept, particularly for users who use email as their data storage (e.g., they email the items to themselves). Apparently, this technique is used as a simple way of protecting the data (by backing it up on the email central server) and getting it replicated (e.g., between work and home.)

When only the owner entry is selected and the third party checkbox 2610 is checked, the view effectively includes all the items in the message store. This may be useful to view all the mailed items regardless of their people association and group them according to some other criteria. In the figure, the checkbox 2610 is checked, thus all direct items sent to or from the user (Andrzej Turski) are displayed.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figures 27, 28:
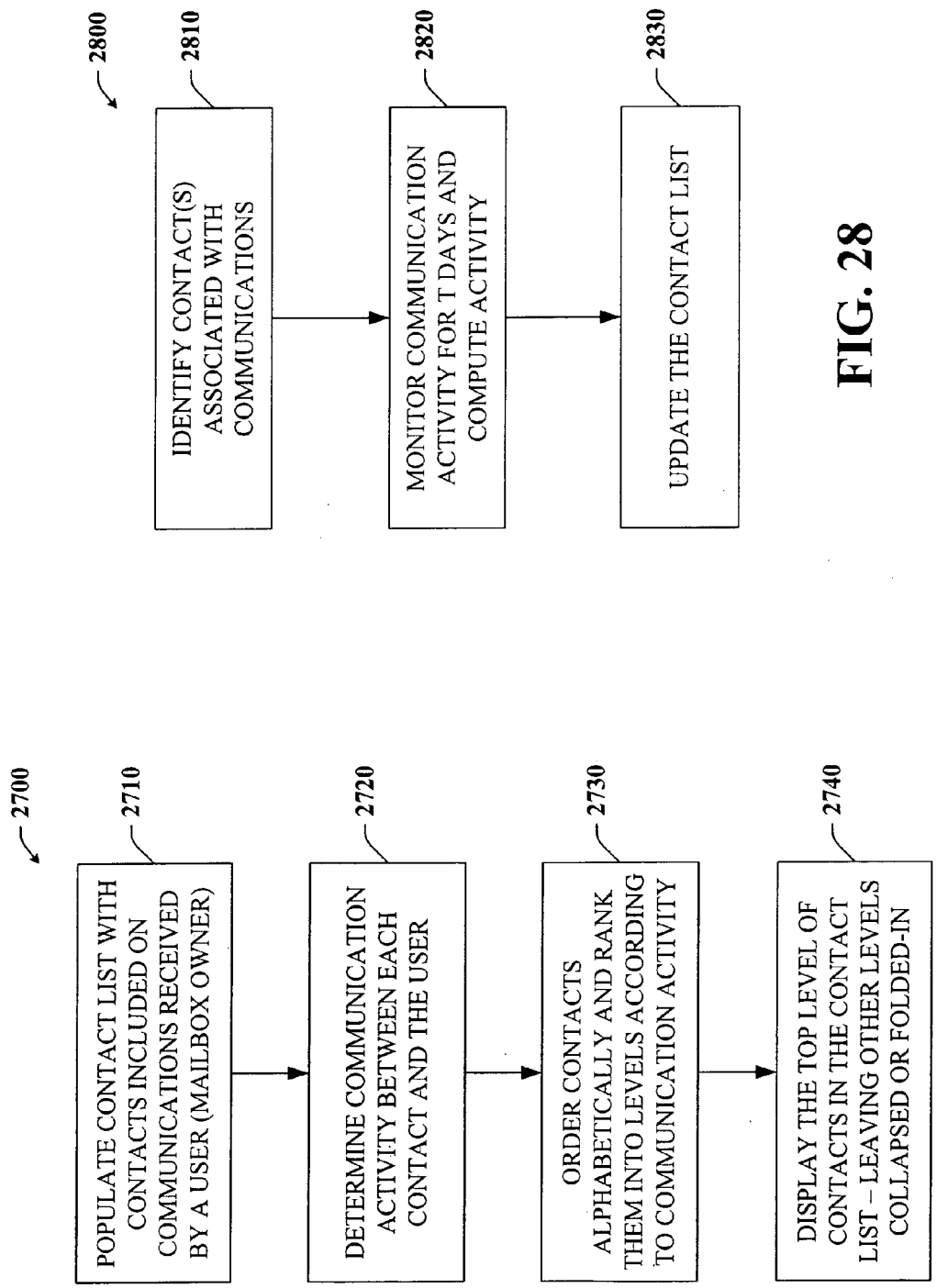
FIG. 27 is a flow chart illustrating an exemplary methodology that facilitates organizing a contact list that can be employed to more readily access messages from a message store based on associations with people in accordance with an aspect of the subject invention.
FIG. 28 is a flow chart illustrating an exemplary methodology that facilitates updating such contact list (FIG. 27) in accordance with an aspect of the subject invention.

Referring now to FIG. 27, there is a flow diagram of an exemplary process 2700 that facilitates contact-based message organization in accordance with an aspect of the subject invention. The process 2700 includes populating a contact list at 2710 with contacts that are included on communications sent to a user (e.g., mailbox owner). The contacts can be at least the sender of the communication as well as any third party recipient of the message (e.g., on the To:, cc:, and/or bcc: lines). At 2720, the relative communication activity between each contact in the list and the user can be determined. The contacts can be ordered alphabetically and then ranked according to their respective communication activity with the user at 2730. At 2740, the top level of the contact list indicating those that are most connected to the user can be made visible on the list and displayed on a user interface. The other contacts in the lower levels can be somewhat hidden, collapsed, or folded-in to the list, but readily accessed due to the alphabetical organization of the list. Though not depicted in the figure, messages or other communications can then organized by contact, whereby the contact is the sender or a third party recipient. In either scenario, the user can view their messages by the people intimately associated with such messages.

Referring now to FIG. 28, there is a flow diagram of an exemplary method 2800 that facilitates populating a contact list in accordance with an aspect of the subject invention. The method 2800 involves identifying the contacts associated with a user's communications at 2810. At 2820, the communication activity with respect to any contact (e.g., person or group) can be monitored for T days to compute an amount of activity in that time period. For example, activity can be monitored in 30 day intervals. To depreciate spam and spammers, more weight can be given to messages received by contacts. If the amount satisfies a threshold set for a particular level of activity, then the contact can be placed at that level. The contact list can be updated at 2830 once such analysis has been performed for each contact.

Referring now to FIG. 29, there is a flow diagram of an exemplary method 2900 that facilitates contact-based message organization in accordance with an aspect of the invention. The method 2900 includes receiving at least one communication at 2910. At 2920, the communication can be organized by sender and secondarily by other third party recipients of the communication. At 2930, the "organized by contact" communication can be stored in a message data store.

Access to and/or retrieval of stored messages can be accomplished as indicated in the exemplary process 3000 of FIG. 30. In the process 3000, at least one contact can be selected (via a check mark in the checkbox) on the contact list at 3010. At 3020, all or substantially communications exchanged between the user and the selected contact can be viewed and displayed in a message window, for example. At 3030, all shared items corresponding to the displayed messages can be shown in a separate space. The process 3000 can proceed to FIGS. 31 and 32.

Figure 31:
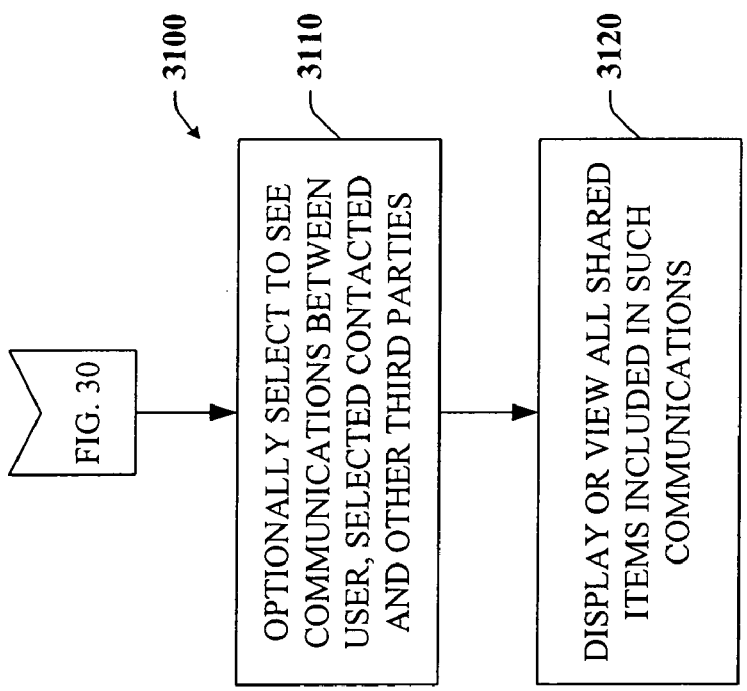
FIG. 31 is a flow chart illustrating an exemplary methodology that facilitates viewing and/or navigating a desired portion of a message store based on contact associations in accordance with an aspect of the subject invention.

In FIG. 31, the user can optionally select to see communications between the user, the selected contact (FIG. 30) and other third parties at 3110. Similarly, when this occurs, the additional shared items included in the third party communications can be added to the display area at 3120.

Figure 32:
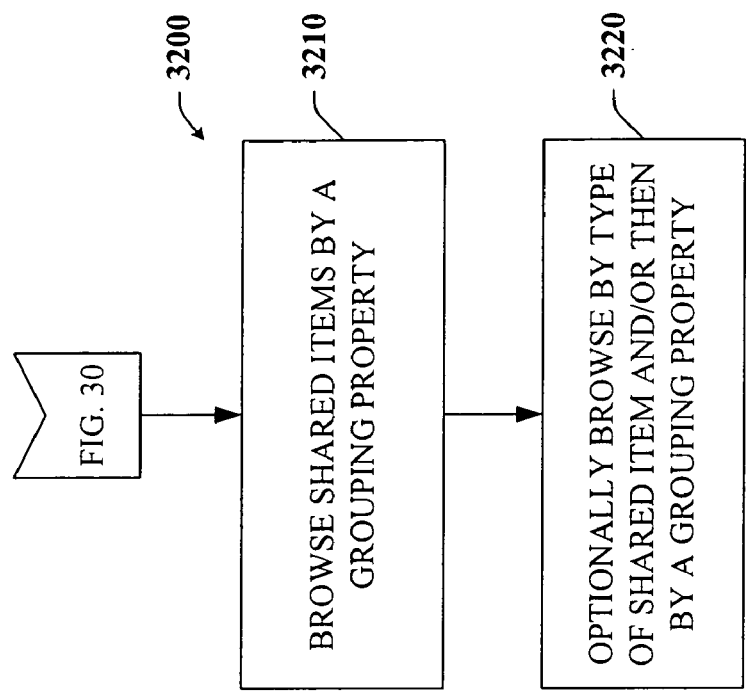
FIG. 32 illustrating an exemplary methodology that facilitates browsing shared items in accordance with an aspect of the subject invention.

Alternatively or in addition, FIG. 32 demonstrates that a subsequent process 3200 can involve browsing shared items by a grouping property (e.g., group by type, sender, date, folder, etc) at 3210. Optionally, the shared items can be browsed by type and then by a grouping property at 3220—to further narrow the items on display.

Figure 33:
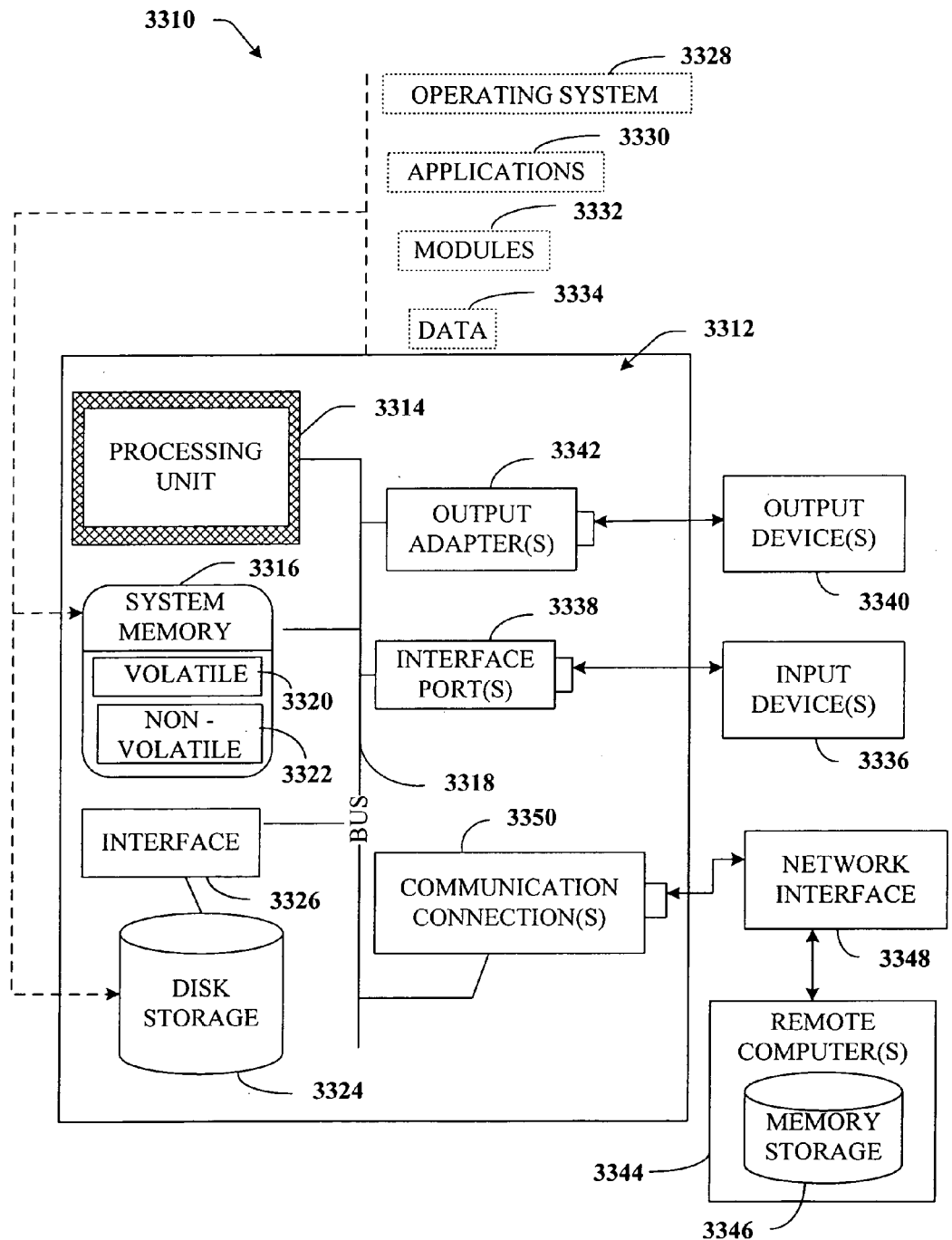
FIG. 33 illustrates an exemplary environment for implementing various aspects of the invention.

In order to provide additional context for various aspects of the subject invention, FIG. 33 and the following discussion are intended to provide a brief, general description of a suitable operating environment 3310 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 3310 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 33, an exemplary environment 3310 for implementing various aspects of the invention includes a computer 3312. The computer 3312 includes a processing unit 3314, a system memory 3316, and a system bus 3318. The system bus 3318 couples system components including, but not limited to, the system memory 3316 to the processing unit 3314. The processing unit 3314 can be any of various available processors. Dual microprocessors and other multiprocessor architectures also can be employed as the processing unit 3314.

The system bus 3318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 3316 includes volatile memory 3320 and nonvolatile memory 3322. The basic input/output system (BIOS), containing the basic routines to transfer information between elements within the computer 3312, such as during start-up, is stored in nonvolatile memory 3322. By way of illustration, and not limitation, nonvolatile memory 3322 can include read only memory (ROM), programmable ROM (PROM), electrically programmable ROM (EPROM), electrically erasable ROM (EEPROM), or flash memory. Volatile memory 3320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 3312 also includes removable/nonremovable, volatile/nonvolatile computer storage media. FIG. 33 illustrates, for example a disk storage 3324. Disk storage 3324 includes, but is not limited to, devices like a magnetic disk drive, floppy disk drive, tape drive, Jaz drive, Zip drive, LS-100 drive, flash memory card, or memory stick. In addition, disk storage 3324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 3324 to the system bus 3318, a removable or non-removable interface is typically used such as interface 3326.

It is to be appreciated that FIG. 33 describes software that acts as an intermediary between users and the basic computer resources described in suitable operating environment 3310. Such software includes an operating system 3328. Operating system 3328, which can be stored on disk storage 3324, acts to control and allocate resources of the computer system 3312. System applications 3330 take advantage of the management of resources by operating system 3328 through program modules 3332 and program data 3334 stored either in system memory 3316 or on disk storage 3324. It is to be appreciated that the subject invention can be implemented with various operating systems or combinations of operating systems.

A user enters commands or information into the computer 3312 through input device(s) 3336. Input devices 3336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3314 through the system bus 3318 via interface port(s) 3338. Interface port(s) 3338 include, for example, a serial port, a parallel port, a game port, and a universal serial bus (USB). Output device(s) 3340 use some of the same type of ports as input device(s) 3336. Thus, for example, a USB port may be used to provide input to computer 3312, and to output information from computer 3312 to an output device 3340. Output adapter 3342 is provided to illustrate that there are some output devices 3340 like monitors, speakers, and printers among other output devices 3340 that require special adapters. The output adapters 3342 include, by way of illustration and not limitation, video and sound cards that provide a means of connection between the output device 3340 and the system bus 3318. It should be noted that other devices and/or systems of devices provide both input and output capabilities such as remote computer(s) 3344.

Computer 3312 can operate in a networked environment using logical connections to one or more remote computers, such as remote computer(s) 3344. The remote computer(s) 3344 can be a personal computer, a server, a router, a network PC, a workstation, a microprocessor based appliance, a peer device or other common network node and the like, and typically includes many or all of the elements described relative to computer 3312. For purposes of brevity, only a memory storage device 3346 is illustrated with remote computer(s) 3344. Remote computer(s) 3344 is logically connected to computer 3312 through a network interface 3348 and then physically connected via communication connection 3350. Network interface 3348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 3350 refers to the hardware/software employed to connect the network interface 3348 to the bus 3318. While communication connection 3350 is shown for illustrative clarity inside computer 3312, it can also be external to computer 3312. The hardware/software necessary for connection to the network interface 3348 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A contact-based message organization and display system comprising:
   memory;
   one or more processors operatively coupled to the memory and disposed within one or more devices;
   a receiving component, stored in the memory and executed on the one or more processors, that receives a plurality of communications;
   a people-based classification component that organizes the plurality of communications according to a plurality of contacts who sent the plurality of communications; and
   a multi-view display component configured to present desired communications of the plurality of communications based at least in part on ones of the plurality of contacts associated with the desired communications, the multi-view display component including a separate view configured to display attachments shared between the user and the ones of the contacts in the desired communications, wherein the attachments shared were sent with or included in the desired communications, wherein at least one of the attachments displayed in the separate view is selectable to cause an associated desired communication that the at least one of the attachments was sent with or included in to be displayed by the multi-view display component, and further wherein the multi-view display component is further configured to extract the attachments from the desired communications for display in the separate view.

2. The system of claim 1, wherein the plurality of communications comprise messages, email, instant messages, and calendar entries.

3. The system of claim 1, wherein the multi-view display component is further configured to display a dynamic contact list that is automatically populated with the plurality contacts.

4. The system of claim 3, wherein the dynamic contact list is ordered alphabetically.

5. The system of claim 3, wherein the dynamic contact list is a two-dimensional list that comprises one or more levels, the one or more levels comprising at least a top level.

6. The system of claim 5, wherein the top level comprises contacts having a relatively high amount of communication activity with the user.

7. The system of claim 3, wherein the dynamic contact list comprises a zoom control to facilitate viewing of at least one of the following:
   lower levels of contacts and contacts hidden from view.

8. The system of claim 5, further comprising an analysis component that determines whether a particular contact's communication activity satisfies a level threshold to place the contact at a respective level of the one or more levels.

9. A contact-based message organization system comprising:
   memory;
   one or more processors operatively coupled to the memory and disposed within one or more devices;
   instructions stored in the memory and executed on the one or more processors to display a user interface, the user interface including:
   a contact list that includes:
      a plurality of contacts that are connected to a user via a plurality of communications;
      a number of levels, the levels comprising at least a top level; and
      a search control configured to match a search term to the plurality of contacts by progressively looking through decreasing levels of the number of levels,
      wherein the top level comprises ones of the plurality of contacts having a relatively high amount of communication activity with the user;
   a message display area that is configured to show ones of the plurality of communications exchanged between at least a selected contact and the user; and
   a shared hyperlinks area configured to display hyperlinks included in the ones of the plurality of communications, and wherein the hyperlinks are extracted from the communications,
   wherein at least one of the displayed hyperlinks is selectable to cause an associated communication of the plurality of communications that the at least one of the displayed hyperlinks was sent with or included in to be displayed in the message display area.

10. The system of claim 9, wherein the shared hyperlinks area comprises a browse control to facilitate navigating through the shared hyperlinks based in part on the shared hyperlinks' metadata.

11. The system of claim 9, wherein the message display area is configured to identify the user and the at least one selected contact proximally to the plurality of communications.

12. The system of claim 9, wherein the message display area comprises a conversational view.

13. One or more computer-readable storage devices comprising computer executable instructions that, upon execution by one or more processors, cause a computer device to perform operations that facilitate organizing and displaying messages in a contact-based manner, the operations comprising:
- reception of a plurality of communications;
- classification of the plurality of communications according to one or more contacts who sent the plurality of communications;
- selection of ones of the plurality of communications for display based at least in part on at least one of the one or more contacts associated with the ones of the plurality of communications; and
- display, in a separate view, calendar entries shared between a user and the one of the one or more contacts in the ones of the plurality of communications, wherein the calendar entries shared were sent with or included in the ones of the plurality of communications, and further where the calendar entries are extracted from the communications being selected for display and displayed in the separate view, and wherein the calendar entries are selectable within the separate view to cause an associated communication of the ones of the plurality of communications that the calendar entries were sent with or included in to be displayed in a message display area.

14. The one or more computer-readable storage devices of claim 13, wherein the operations further comprise automatic population of a contact list of the one or more contacts in alphabetical order.

15. The one or more computer-readable storage devices of claim 13, wherein the operations further comprise display of the one or more contacts on a contact list according to a determined level of communication activity with the user.

16. The one or more computer-readable storage devices of claim 13, wherein the operations further comprise display of the plurality of communications associated with at least one selected contact of the one or more contacts.

17. The one or more computer-readable devices of claim 13, wherein the operations further comprise selection of communications for display to a user based at least in part on at least two contacts associated with the plurality of communications.

18. A contact-based message organization and display system comprising:
- memory;
- one or more processors operatively coupled to the memory and disposed within one or more devices;
- a receiving component, stored in the memory and executed on the one or more processors, that receives a plurality of communications;
- a people-based classification component that organizes the plurality of communications according to one or more contacts who sent the plurality of communications, the people-based classification component recognizes a plurality of email addresses originating from the one or more contacts and organizes the plurality of email addresses as associated with the one or more contacts;
- a multi-view display component that presents ones of the plurality of communications in an organized manner that is based at least in part on the one or more contacts, the multi-view display component displays, in a separate view, web pages shared between a user and the one or more contacts in the ones of the plurality of communications, such that conversations associated with the ones of the plurality of communications appear in a separate view from the web pages shared, and
- wherein the web pages are selectable in the separate view to cause an associated communication of the ones of the plurality of communications that the web pages were sent with or included in to be displayed by the multi-view display component, and wherein the web pages shared were sent with or included in the ones of the plurality of communications.

* * * * *

UNITED STATES PATENT AND TRADEMARK OFFICE
CERTIFICATE OF CORRECTION

| | | |
|---|---|---|
| PATENT NO. | : 8,065,369 B2 | Page 1 of 1 |
| APPLICATION NO. | : 11/048210 | |
| DATED | : November 22, 2011 | |
| INVENTOR(S) | : Andrzej Turski et al. | |

It is certified that error appears in the above-identified patent and that said Letters Patent is hereby corrected as shown below:

IN THE CLAIMS:

In column 19, line 15, in Claim 13, delete "where" and insert -- wherein --, therefor.

Signed and Sealed this
Tenth Day of January, 2012

David J. Kappos
*Director of the United States Patent and Trademark Office*